United States Patent [19]

Moritomo

[11] Patent Number: 5,737,315
[45] Date of Patent: *Apr. 7, 1998

[54] TRAFFIC CONTROL DEVICE IN PRIVATE ATM NETWORK

[75] Inventor: Haruo Moritomo, Kanagawa, Japan

[73] Assignee: Fujitsu Limited, Kanagawa, Japan

[*] Notice: The term of this patent shall not extend beyond the expiration date of Pat. No. 5,581,545.

[21] Appl. No.: 712,071

[22] Filed: Sep. 11, 1996

Related U.S. Application Data

[62] Division of Ser. No. 353,894, Dec. 12, 1994, Pat. No. 5,581,545.

[30] Foreign Application Priority Data

Mar. 16, 1994 [JP] Japan .................. 6-046122

[51] Int. Cl.⁶ .................. H04J 3/14; H04L 12/56
[52] U.S. Cl. .................. 370/235; 370/395
[58] Field of Search .................. 370/229, 230, 370/231, 232, 233, 234, 235, 236, 237, 238, 252, 253, 358, 389, 391, 392, 395, 396, 397, 398, 399, 400, 409, 410, 428, 429, 431, 462, 464, 465, 468, 522, 412, 413

[56] References Cited

U.S. PATENT DOCUMENTS

| | | | |
|---|---|---|---|
| 5,007,043 | 4/1991 | van den Dool et al. | 370/232 |
| 5,119,367 | 6/1992 | Kawakatsu et al. | 370/232 |
| 5,224,091 | 6/1993 | Brandt | 370/235 |
| 5,253,247 | 10/1993 | Hirose et al. | 370/232 |
| 5,274,641 | 12/1993 | Shobatake et al. | 370/392 |
| 5,287,347 | 2/1994 | Spanke | 370/235 |
| 5,317,563 | 5/1994 | Oouchi et al. | 370/232 |
| 5,335,222 | 8/1994 | Kamoi et al. | 370/230 |
| 5,555,264 | 9/1996 | Sällberg et al. | 370/414 |
| 5,581,545 | 12/1996 | Moritomo | 370/237 |

FOREIGN PATENT DOCUMENTS

| | | |
|---|---|---|
| 2272939 | 11/1990 | Japan . |
| 389744 | 4/1991 | Japan . |

*Primary Examiner*—Wellington Chin
*Assistant Examiner*—Huy D. Vu
*Attorney, Agent, or Firm*—Helfgott & Karas, P.C.

[57] ABSTRACT

If an illegal cell number is detected three times continuously for a monitor section in a connection, then tag information including class information indicating the lowest quality class is added to a cell in the connection. If a normal cell number is detected four times continuously for the monitor section with the quality class of the cell lowered for the connection, then the quality class of the cell in the connection is restored to its original class. If an illegal cell number is detected n times continuously for the monitor section with the quality class of the cell lowered in the connection, then the tag information including valid/invalid information indicating an invalid state is added to the cell in the connection. As a result, the cell is stopped from being transmitted to a cell switch. If a normal cell number is detected m times continuously with the transmission of cells stopped, then the cell is released from the stop to the transmission of cells to the cell switch.

8 Claims, 22 Drawing Sheets

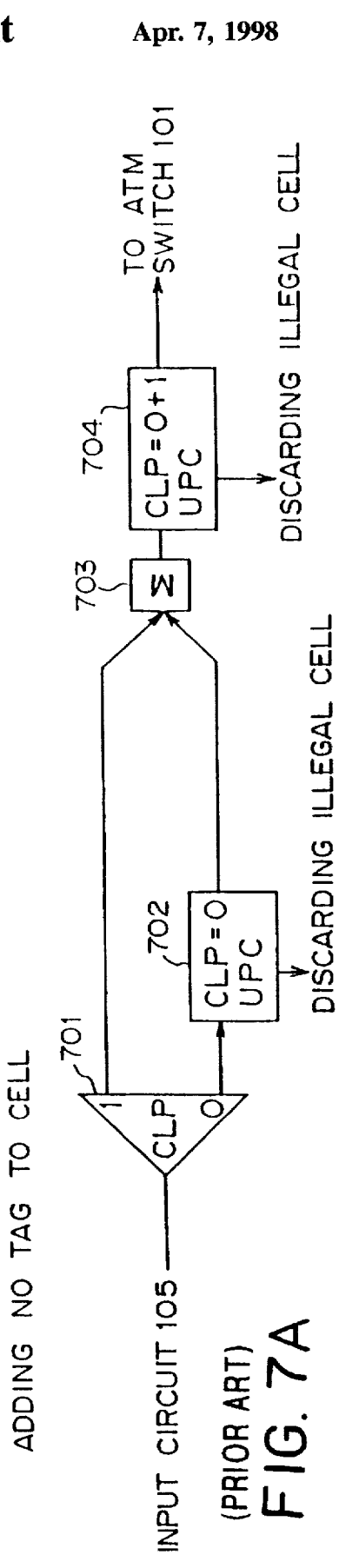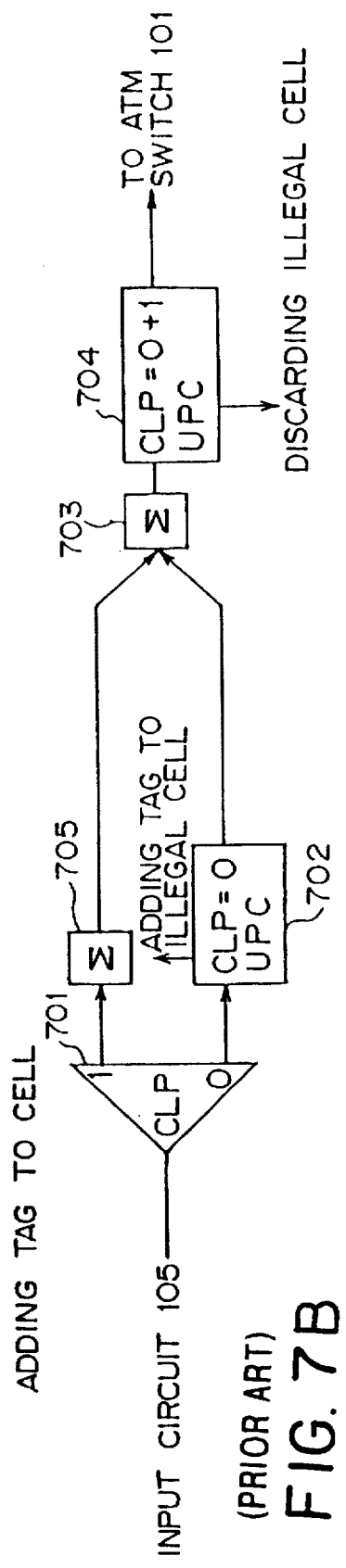
FIG. 7A (PRIOR ART)
FIG. 7B (PRIOR ART)

USER-DECLARED BAND MANAGEMENT TABLE 1301

| VPI/VCI → | 1302 DECLARED CELL NUMBER | 1303 ILLEGAL CELL NUMBER FREQUENCY | 1304 NORMAL CELL NUMBER FREQUENCY | 1305 QUALITY CLASS AT DECLARATION | 1306 STATE |
|---|---|---|---|---|---|
| | | | | | |
| | | | | | |
| | | | | | |

FIG. 13

TRAFFIC CONTROL DEVICE IN PRIVATE ATM NETWORK

This is a division of application Ser. No. 08/353,894, filed Dec. 12, 1994 and now U.S. Pat. No. 5,581,545.

BACKGROUND OF THE INVENTION

1. Field of the Invention

The present invention relates to a traffic control device for protecting resources in a network in, for example, a private asynchronous transfer mode (ATM) network.

2. Description of the Related Art

Recently, broadband switching units have been widely developed and are expected to be used more popularly in a broadband network operated by an ATM system. The ATM broadband network is also expected to be adopted in a private network.

The broadband switching unit in a public ATM network is designed according to the standard specification determined by the International Telecommunication Union-Telecommunication Standardization Sector (ITU-T) whereas the broadband switching unit used in the private ATM network need not be designed according to the specification.

The above described discussion about the ATM network is also effective in a conventional narrow band-integrated services digital network (N-ISDN). That is, a number of switching units used in a private N-ISDN have some useful functions in addition to the capabilities of the switching units used in a public N-ISDN, or are provided with the capabilities of the switching units used in a public N-ISDN by substitute units.

A traffic control function protects resources in a network. It is realized by a use amount parameter control system in the public ATM network. Then, it is very important in the private ATM network to effectively realize the capabilities of the use amount parameter control system in the public ATM network.

FIG. 1 shows a conventional technology of the use amount parameter control function currently used in the broadband ATM switching unit in the public ATM network.

A call reception control unit 103 receives the declaration of a declared band. Then, the cell reception control unit 103 obtains from a band management unit 104 a space band in a circuit used by a user from among output circuits 106 connected to an ATM switch (self-routing switch) 101. The call reception control unit 103 then compares the space band with the user-declared band to determine whether or not a request to set a call is accepted from the user. If it is accepted, the call reception control unit 103 sets in a usage parameter control unit 102 provided on an input circuit 105 connected to the ATM switch 101 the declared band for the user who issued the request.

The usage parameter control unit 102 is realized by a dedicated hardware and monitors for each connection of a user of the input circuit 105 connected to the usage parameter control unit 102 whether or not a band of each connection is larger than a declared band corresponding to the connection. If the usage parameter control unit 102 detects a connection of a band larger than the declared band, it normally discards the cell of the connection as illegal.

As a result, as shown in FIG. 2, the band of a connection is controlled at the input circuit 105 such that it should be smaller than the declared band for the connection, thereby preventing congestion in the ATM switch 101 and the output circuit 106 from occurring.

A band is declared by a user using a peak band which is used the lost frequently in all bands used for the services to the user. The usage parameter control unit 102 also manages bands using the peak band. Practically, if a user connected to an interface having a transmission rate of 150 Mb/s (megabits/second) tries to provide a communications service, the user declares 100 Mb/s as the most frequently used band in his or her communications services as shown in FIG. 3 to the call reception control unit 103 shown in FIG. 1. The usage parameter control unit 102 performs its control on each connection such that the peak band declared for each connection is larger than the peak band currently used by the connection.

Described below is the conventional technology of the use amount parameter control system practically realized by the usage parameter control unit 102 shown in FIG. 1.

FIG. 4 shows the case where the use amount parameter control function performed by the usage parameter control unit 102 is realized by the conventional system called a leaky bucket system.

In FIG. 1, a cell received from the input circuit 105 is sequentially stored by a buffer 401 shown in FIG. 4 provided in the usage parameter control unit 102. The usage parameter control unit 102 reads for each connection the cell stored in the buffer 401 at a rate corresponding to the declared band for the connection, and outputs it to the ATM switch 101 (FIG. 1).

As a result, shown in FIG. 4 is the relationship between input and output cells to and from the usage parameter control unit 102 for a connection. Assuming that the number of cells remaining in the buffer 401 allowed corresponding to a declared band of one connection is three, an input cell is discarded when the number of input cells to the connection reaches four in the buffer 401 (the ninth input cell in FIG. 4).

FIG. 5 shows the case where the use amount parameter control function performed by the usage parameter control unit 102 shown in FIG. 1 is realized by the conventional system called a sliding window system.

A window is set for each connection. The window has a given time length Ts by which it is shifted at the shortest cell time intervals. When the number of input cells N in the window exceeds the number of cells Ns in the window allowable for the declared band for each connection at each monitor point, the latest input cell in the window is discarded as an illegal cell.

FIG. 6 shows the case in which the use amount parameter control function performed by the usage parameter control unit 102 is realized by the conventional system called a jumping window system.

With this system, a plurality of windows (three in the example shown in FIG. 6) shown in FIG. 5 are simultaneously set in the time direction. The monitor results of these windows are simultaneously determined to check whether or not an input cell is illegal.

In each of the above described systems shown in FIGS. 4 through 6, further proposed is a system in which a difference can be allowed in cell arrival time depending on, for example, a route in a network.

FIGS. 7A and 7B show using cell loss priority (CLP) information the conventional system which realizes the use amount parameter control function performed by the usage parameter control unit 102 shown in FIG. 1.

The CLP is 1-bit information added to the header of a cell. A user can use the CLP to assign priority to each cell. For example, assuming that the information to be transmitted in a cell is image information, an image cannot be regenerated if, for example, the frame information is lost. Therefore, a cell transmitting image frame information is assigned a high priority of CLP=0. On the other hand, for example, image information such as that indicating the background of a scene is assigned a low priority of CLP=1 because it can be interpolated from the adjacent frames.

The usage parameter control unit 102 shown in FIG. 1 divides an input cell for two routes according to CLP values added to the input cell through a selector 701 as shown in FIG. 7A. The band of an input cell divided by the selector 701 and assigned the high priority (CLP=0) is monitored for each connection by a first control unit 702 according to the above described systems shown in FIGS. 4 through 6, and an illegal cell is discarded. The input cell assigned the high priority (CLP=0) and not discarded by the first control unit 702 is mixed by a mixing unit 703 with the input cell divided by the selector 701 and assigned the low priority (CLP=1). Then, the bands of the mixed input cells are monitored for each connection by a second control unit 704 according to the above described systems shown in FIGS. 4 through 6, and an illegal cell is discarded. In each connection, the input cell assigned the low priority (CLP=1) is discarded before the input cell assigned the high priority (CLP=0).

The control system shown in FIG. 7B can also be adopted. In this case, if the input cell divided by the selector 701 and assigned the high priority (CLP=0) is determined to be illegal by the first control unit 702, then the illegal cell is not discarded, and the CLP value of the input cell is forced to be rewritten into 1 indicating the low priority. The input cell is mixed with the input cell divided by the selector 701 and assigned the low priority (CLP=1).

According to the above described control systems, determined is a cell to be discarded for each connection according to the priority assigned to each cell.

The conventional use amount parameter control in the public ATM network should be conducted for each connection, that is, for each virtual path identifier (VPI) and virtual channel identifier (VCI) added to the header of a cell. However, in a broadband switching unit used in the public ATM network, a great number of users are assigned to a single input circuit 105 (FIG. 1), and the transmission rate of the input circuit 105 is as high as 150 Mb/s. Therefore, the usage parameter control unit 102 shown in FIG. 1 cannot perform a realtime cell monitoring process unless realized by dedicated hardware.

Thus, introducing the capabilities of the use amount parameter control function to the switching unit of a private ATM network generates the problem of an increased-cost and large-scale switching unit.

Furthermore, since a private ATM network can be operated according to a given standard based on an agreement and reliability among users connected over the network and does not need the strict cell monitoring function required by the switching unit in the public ATM network, the introduction of the capabilities of the use amount parameter control function to the switching unit of the private ATM network could generate a functional waste.

However, a connection of a user who requests communications frequently to an unreasonable extent should be deleted in any private ATM network. Moreover, resources in a network should be appropriately protected in a private ATM network because a cell may erroneously enter the network due to an unintentional malfunction of, for example, a terminal unit.

SUMMARY OF THE INVENTION

The present invention has been developed based on the above described background, and aims to realize a traffic control through a simple and low cost structure for use in a network, e.g. a private ATM network requiring a moderate protection of resources therein.

The present invention relates to a traffic control device which is operated in a network and controls the transmission quality of a cell according to a quality class assigned to the cell.

The present invention first comprises a flow monitor unit for monitoring the flow of cells in each connection for monitor sections segmented at predetermined intervals.

Then, it comprises an illegal cell number monitor unit for monitoring whether or not an illegal number of cells have been detected in a predetermined time unit by comparing the flow of cells in each monitor section of each connection monitored by the flow monitor unit with the flow of cells in a monitor section preliminarily declared for each connection.

Next, the present invention comprises a first state determining unit for determining whether or not the illegal cell number monitor unit has detected continuously at a first protection frequency a state in which the illegal number of cells exist for each connection in a monitor section.

The present invention further comprises a quality class lowering unit for changing the quality class of a cell in a connection into one class lower than the present quality class if the first state determining unit has determined for the connection that the state in which the illegal number of cells exist has been detected continuously at the first protection frequency.

Then, the present invention comprises a second state determining unit for determining whether or not the illegal cell number monitor unit has detected continuously at a second protection frequency for the connection whose quality class has been lowered by the quality class lowering unit a state in which the illegal number of cells do not exist in a monitor section.

The present invention also comprises a quality class restoring unit for restoring the quality class of a cell in a connection to a quality class preliminarily set for the connection if the second state determining unit has determined that a state in which the illegal number of cells do not exist has been detected continuously at the second protection frequency for the connection.

The present invention can add the following configuration to the above described structure.

It also comprises a third state determining unit for determining whether or not the illegal cell number monitor unit has detected continuously at a third protection frequency higher than the first protection frequency for the connection whose quality class has been lowered by the quality class lowering unit a state in which the illegal number of cells exist in a monitor section.

Then, it comprises a cell discarding unit for discarding a cell in a connection if the third state determining unit has determined that the state in which the illegal number of cells exist has been detected continuously at the third protection frequency.

It further comprises a fourth state determining unit for determining whether or not the illegal cell number monitor unit has detected continuously at a fourth protection frequency higher than the second protection frequency in a monitor section a state in which the illegal number of cells do not exist for a connection corresponding to a cell discarded by the cell discarding unit.

The present invention further comprises a cell discard suppressing unit for preventing the cell discarding unit from discarding a cell in a connection if the fourth state determining unit has determined for the connection that the state in which the illegal number of cells do not exist has been detected continuously at the fourth protection frequency.

According to the present invention with the above listed configurations, the flow monitor unit can be an existing hardware initially provided for a circuit terminating equipment. Other units can be realized through software processing performed by, for example, a processor of a switching unit, not by dedicated hardware, because the present invention has been developed for use in a small-scale network such as a private ATM network. Therefore, traffic control can be conducted by a simple and low-cost structure.

Then, the present invention notices that, unlike the conventional use amount parameter control function, strict conditions are not required in monitoring cells in the small-scale network such as a private ATM network. Accordingly, if an illegal number of cells exist in a connection at the first protection frequency, then the cells in the connection can be easily controlled by lowering the quality class assigned to the cells. If a state in which the illegal number of cells do not exist is detected continuously at the second protection frequency, then the quality of the connection can be easily restored to its original quality by restoring the quality class assigned to the cells in the corresponding connection to their original class.

Furthermore, according to the present invention, if a state in which an illegal number of cells exist is detected continuously at the third protection frequency higher than the first protection frequency for the connection whose quality class has been lowered, then the cells in the connection are discarded so as to protect the network against cells defective due to, for example, a malfunction of a user terminal. In this case, the defective connection can be easily restored to its original state by stopping cells from being discarded if the illegal number of cells have not been detected continuously at the fourth protection frequency.

BRIEF DESCRIPTION OF THE DRAWINGS

One skilled in the art can easily understand additional features and objects of this invention from the description of the preferred embodiments and some of the attached drawings. In the drawings:

FIGS. 7A and 7B show the use amount parameter control function realized by using the CLP;

FIG. 13 shows the configuration of the user declared band management table;

DESCRIPTION OF THE PREFERRED EMBODIMENTS

Explanation of the Principle

Figure 1:
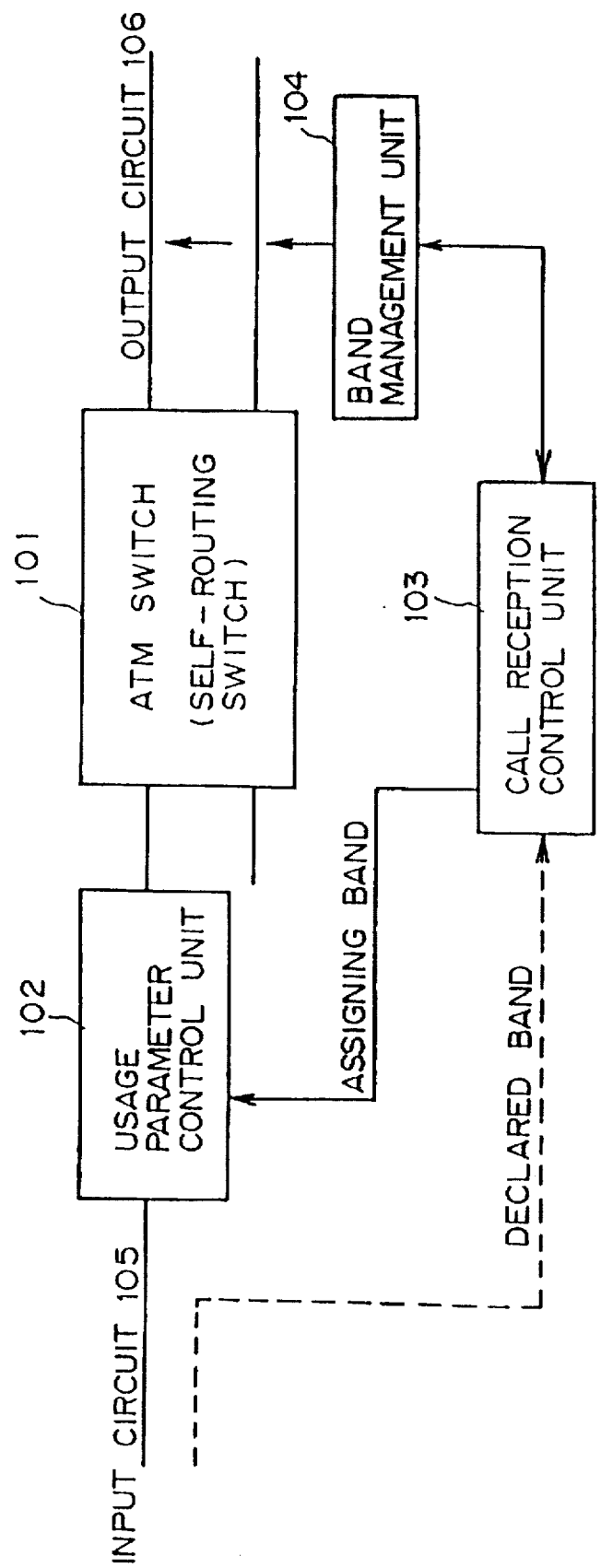
FIG. 1 is a block diagram showing the function of the conventional use amount parameter control system.
Figure 2:
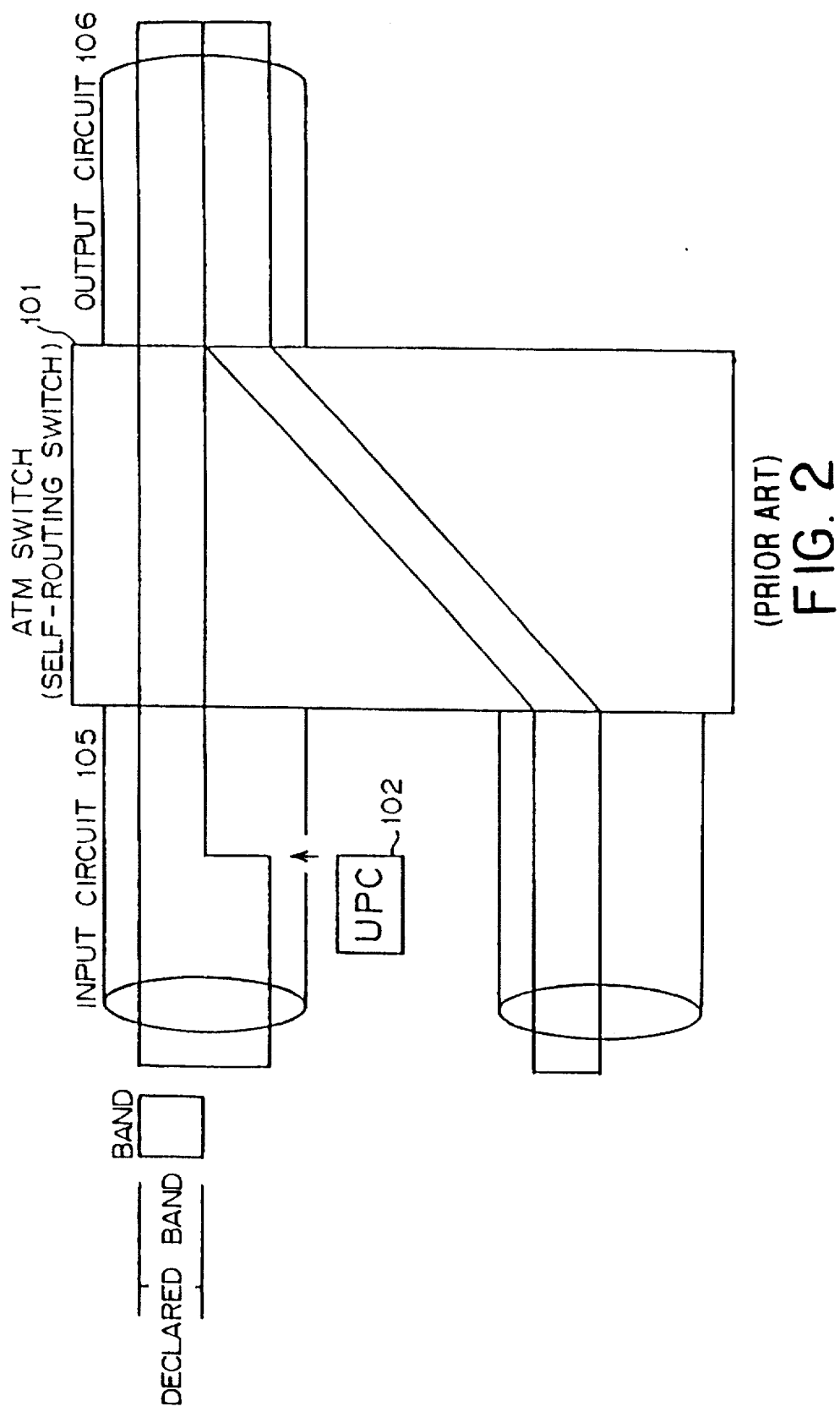
FIG. 2 shows the concept of the operation of the conventional use amount parameter control system.
Figure 3:
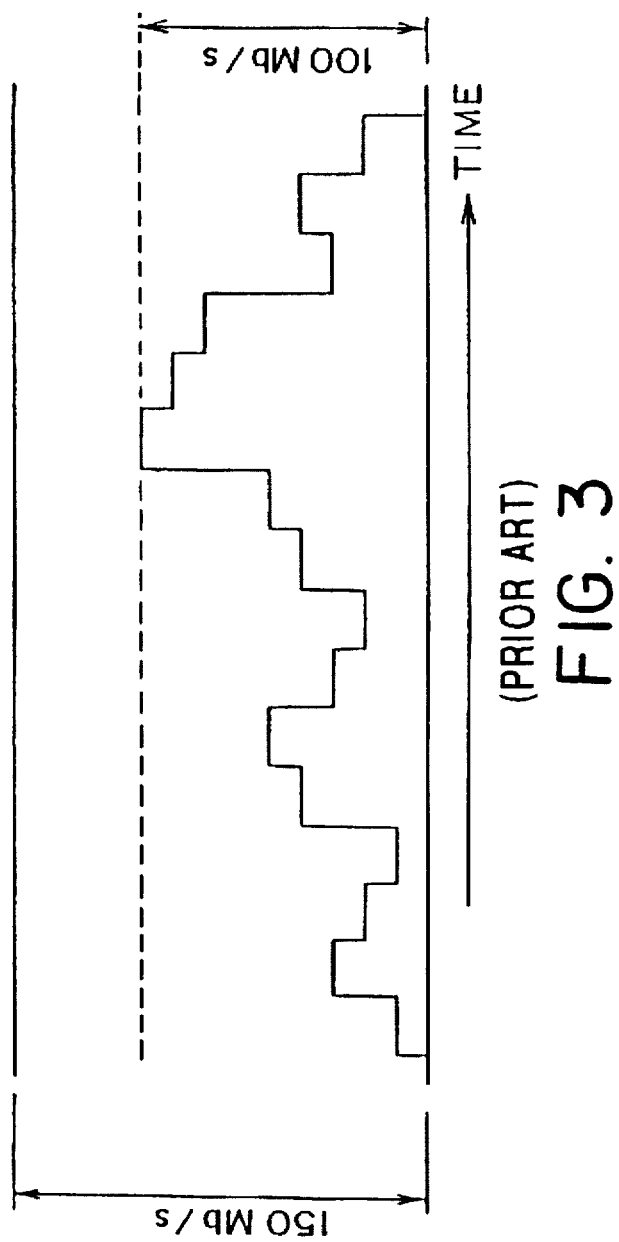
FIG. 3 shows the traffic control exercised when a declared band is limited to the peak band.
Figure 4:
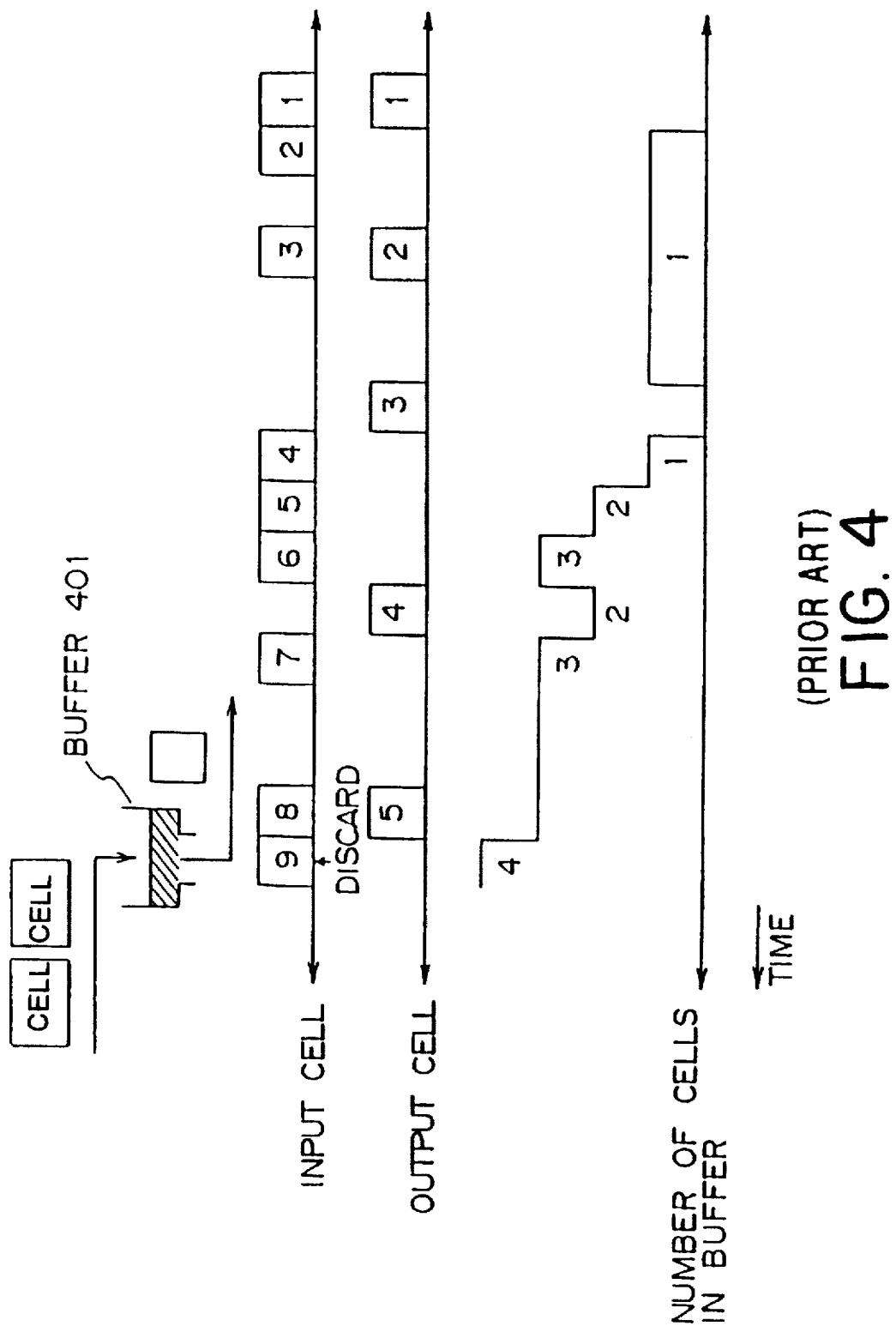
FIG. 4 shows the conventional use amount parameter control function realized by the leaky bucket system.
Figure 5:
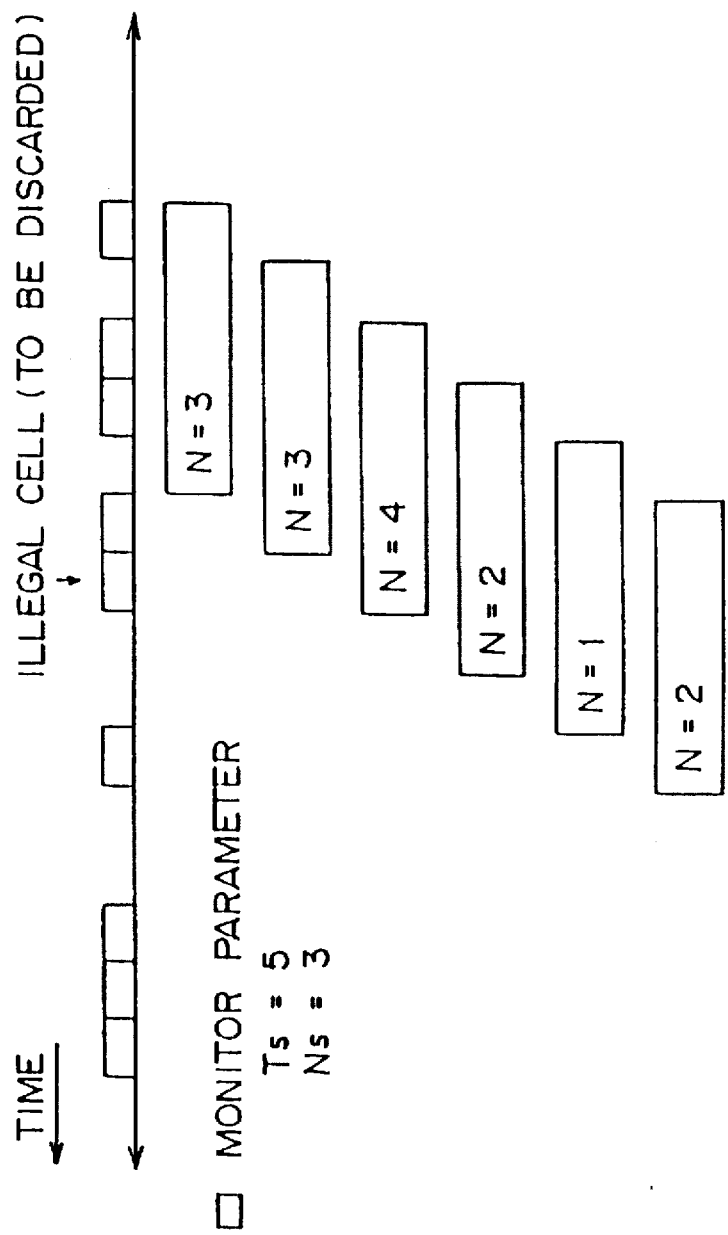
FIG. 5 shows the conventional use amount parameter control function realized by the sliding window system.
Figure 6:
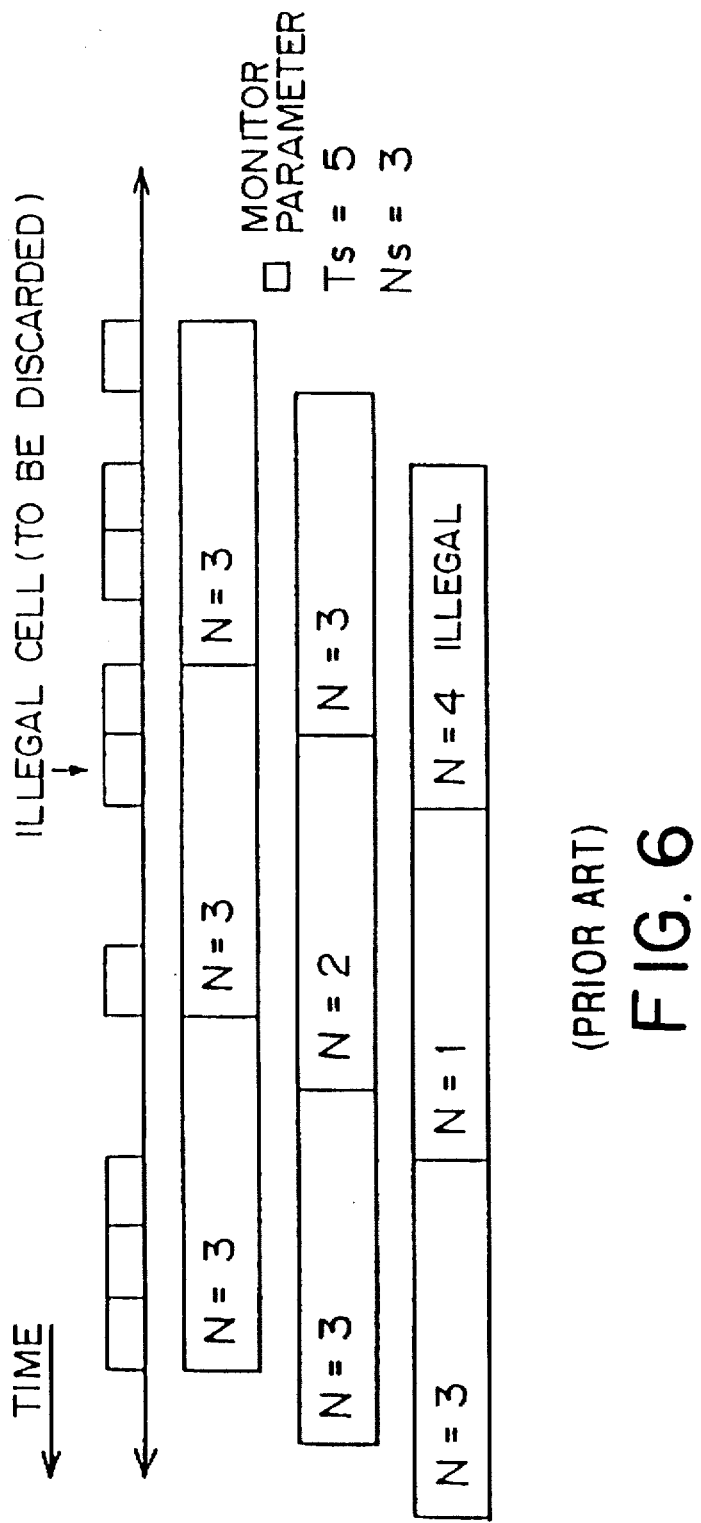
FIG. 6 shows the conventional use amount parameter control function realized by the jumping window system.
Figure 8:
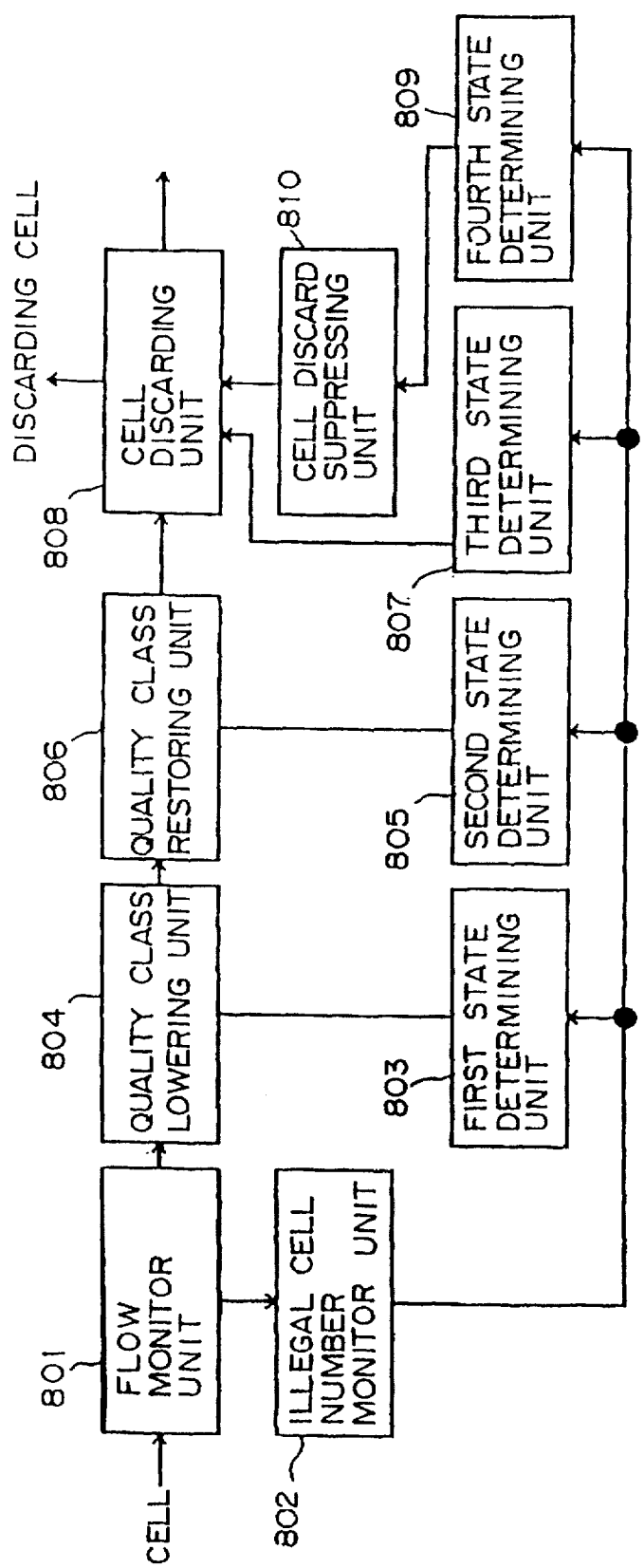
FIG. 8 is a block diagram showing the principle of the present invention.

FIG. 8 is the block diagram showing the principle of the present invention.

The present invention relates to a traffic control device which controls the transmission quality of a cell according to a quality class assigned to the cell and is used in a network structured by, for example, the asynchronous transmission mode system.

Described below is the first aspect of the present invention.

The flow monitor unit 801 monitors the flow of cells in each connection for each monitor section defined at predetermined intervals in a network. The function of the unit is normally provided in a circuit terminating equipment of an ATM switching unit.

An illegal cell number monitor unit 802 monitors whether or not an illegal number of cells have been detected in a predetermined time unit by comparing the flow of cells in each monitor section of each connection monitored by the flow monitor unit with the flow of cells in a monitor section preliminarily declared for each connection.

A first state determining unit 803 determines whether or not the illegal cell number monitor unit 802 has detected continuously at a first protection frequency a state in which the illegal number of cells exist for each connection in a monitor section.

A quality class lowering unit 804 changing the quality class of a cell in a connection into one class lower than the present quality class if the first state determining unit 803 has determined for the connection that the state in which the illegal number of cells exist has been detected continuously at the first protection frequency. For example, the quality class lowering unit 804 changes the value of class information contained in the tag information added to the cell in the connection determined by the first state determining unit 803 into a value corresponding to a quality class (for example, the lowest quality class) lower than that currently assigned to the cell.

A second state determining unit 805 determines whether or not the illegal cell number monitor unit 802 has detected continuously at a second protection frequency for the connection whose quality class has been lowered by the quality class lowering unit 804 a state in which the illegal number of cells do not exist in a monitor section.

A quality class restoring unit 806 restores the quality class of a cell in a connection to a quality class preliminarily set for the connection if the second state determining unit 805 has determined that a state in which the illegal number of cells do not exist has been detected continuously at the second protection frequency for the connection. For example, the quality class restoring unit 806 restores the value of class information contained in the tag information added to the cell in the connection determined by the second state determining unit 805 to a value corresponding to a quality class preliminarily assigned to the connection.

A third state determining unit 807 determines whether or not the illegal cell number monitor unit 802 has detected continuously at a third protection frequency higher than the first protection frequency for the connection whose quality class has been lowered by the quality class lowering unit 84 a state in which the illegal number of cells exist in a monitor section.

A cell discarding unit 808 discards a cell in a connection if the third state determining unit 807 has determined that the state in which the illegal number of cells exist has been detected continuously at the third protection frequency. For example, the cell discarding unit 808 comprises an invalid state setting unit for changing into a value indicating an invalid state a value of valid/invalid information contained in the tag information added to the cell in the connection determined by the third state determining unit 807 and a cell valid/invalid determination control unit for discarding a cell if the value of valid/invalid information contained in the tag information added to the cell transmitted in a network is a value indicating an invalid state.

A fourth state determining unit 809 determines whether or not the illegal cell number monitor unit 802 has detected continuously at a fourth protection frequency higher than the second protection frequency in a monitor section a state in which the illegal number of cells do not exist for a connection corresponding to a cell discarded by the cell discarding unit 808.

A cell discard suppressing unit 810 prevents the cell discarding unit 808 from discarding a cell in a connection if the fourth state determining unit 809 has determined for the connection that the state in which the illegal number of cells do not exist has been detected continuously at the fourth protection frequency. For example, the cell discard suppressing unit 810 comprises a valid state setting unit for changing into a value indicating a valid state a value of valid/invalid information contained in the tag information added to the cell in the connection determined by the fourth state determining unit 809.

Based on the above described first and second aspects of the present invention, the third aspect of the present invention is configured as follows.

The present invention also comprises a congestion determining unit.

If the congestion determining unit determines that traffic congestion has been detected in a network, then the traffic control operation described above as the first and second aspects is initiated.

With the above listed configuration of the present invention, the flow monitor unit according to the first and second aspects can be an existing hardware initially provided for a circuit terminating equipment. Other units shown in FIG. 8 can be realized through software processing performed by, for example, a processor of a switching unit, not by dedicated hardware, because the present invention has been developed for use in a small-scale network such as a private ATM network. Therefore, traffic control can be conducted by a simple and low-cost structure.

Then, in the first aspect of the present invention, it is noticed that, unlike the conventional use amount parameter control function, strict conditions are not required in monitoring cells in the small-scale network such as a private ATM network. Accordingly, if an illegal number of cells exist in a connection at the first protection frequency, then the quality class of the cell in the associated connection is changed to a quality class lower than the currently assigned to the cell, for example, the lowest class. Using the predetermined quality class, the cells in the connection can be easily controlled by lowering the quality class assigned to the cells, for example, exercising a cell flow control. As a result, the quality of the cells in other connections can be guaranteed. If a state in which the illegal number of cells do not exist is detected continuously at the second protection frequency, then the quality of the connection can be easily restored to its original quality by restoring the quality class assigned to the cells in the corresponding connection to their original class.

Furthermore, according to second aspect of the present invention, if a state in which an illegal number of cells exist is detected continuously at the third protection frequency higher than the first protection frequency for the connection whose quality class has been lowered, then the cells in the connection are discarded so as to protect the network against cells defective due to, for example, a malfunction of a user terminal. In this case, the defective connection can be easily restored to its original state by stopping cells from being discarded if the illegal number of cells have not been detected continuously at the fourth protection frequency.

According to the third aspect of the present invention, the above described traffic control is exercised when it is determined that the traffic congestion is arising so that response performance in, for example, a call setting process can be prevented from being lowered by an increase of a process load in a processor of a switching unit.

Explanation about Preferred Embodiments

The preferred embodiments of the present invention are explained in detail by referring to the attached drawings.

First, an optical interface 901 is an optical fiber cable in a single or multiple mode.

A cell received from the optical interface 901, which is an upward input circuit, is electrically terminated by a physical layer terminating unit 903 through an opto-electrical converting circuit 902, and then accepted by an ATM layer terminating unit 904.

The physical layer terminating unit 903 generates and receives a signal waveform, adds, deletes, and encodes bit timing information, etc. The physical layer terminating unit 903 generates and removes a transmission frame, maps an ATM cell to a payload unit of the transmission frame, adds a header error check (HEC) bit to a header of the transmission frame, checks and corrects a header error, etc.

Figure 10:
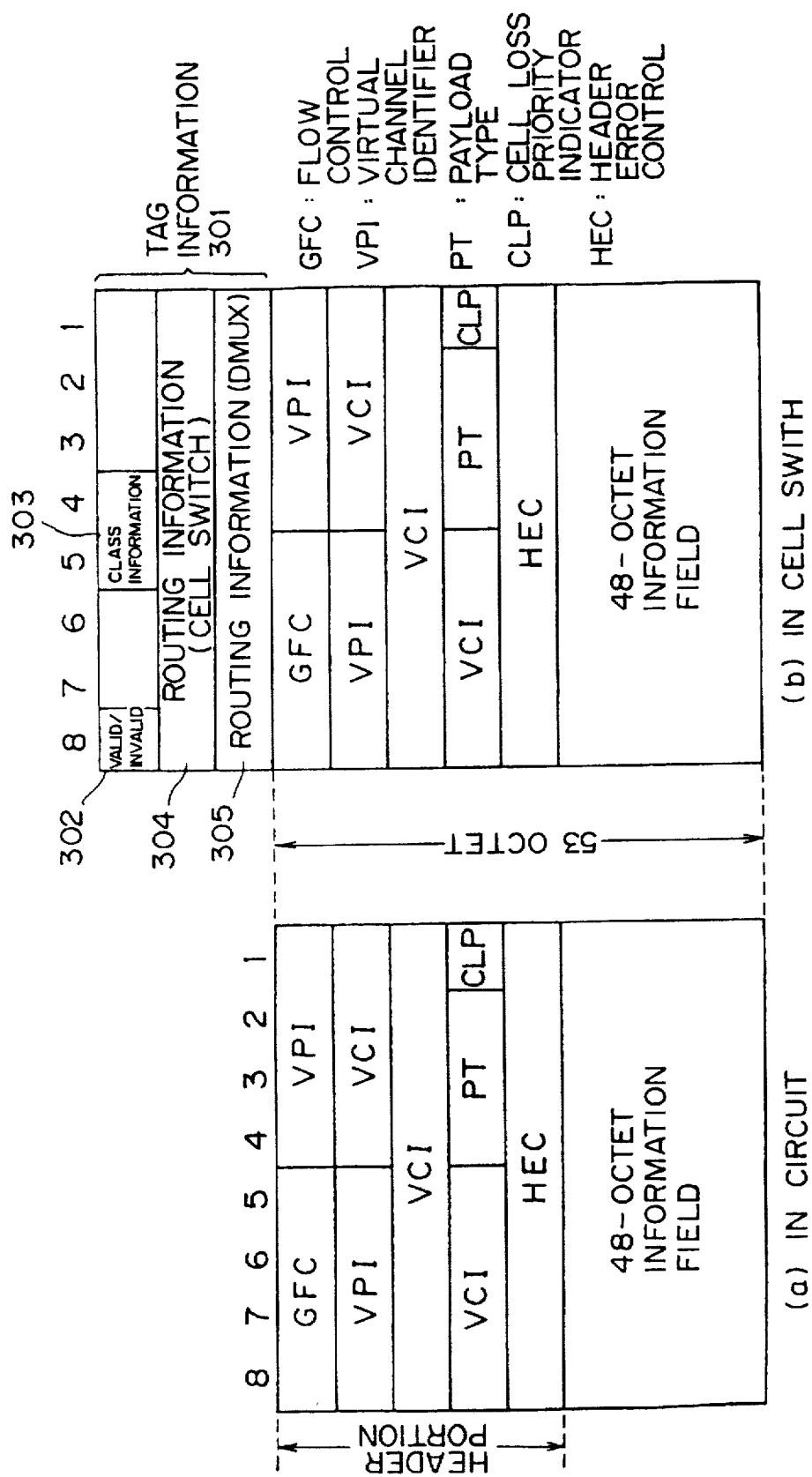
FIG. 10 shows the cell format.

The ATM cell has a data format as shown in part (a) in FIG. 10, comprising a total of 53-octet data, that is, a header of 5-octet data and an information field of 48-octet data.

The ATM layer terminating unit 904 multiplexes a plurality of virtual paths (virtual channels) to a single cell flow, or demultiplexes virtual paths/virtual channels from a single cell flow. Furthermore, the ATM layer terminating unit 904 generates and deletes a header of an ATM cell also counts the received cells for each connection.

Figure 11:
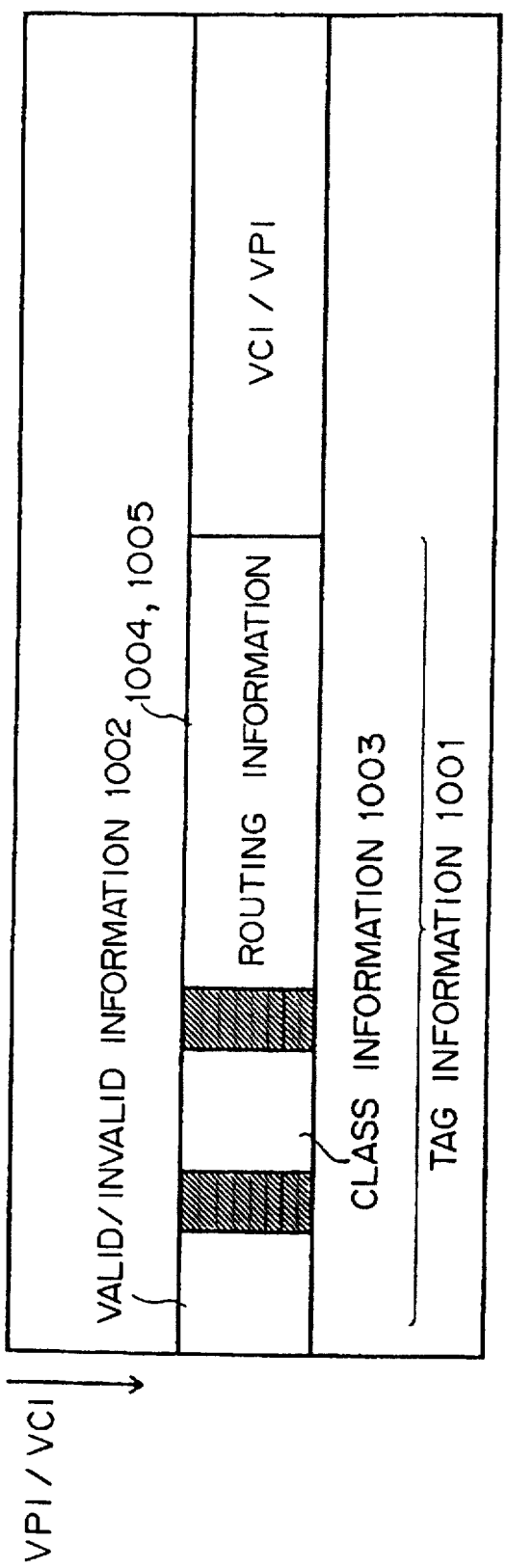
FIG. 11 shows the configuration of the VPI/VCI conversion table.

A tag information adding and VPI/VCI converting unit 906 converts a VPI and a VCI added to the header of a cell output by the ATM layer terminating unit 904 into a VPI/VCI recognizable by a next switching unit connected to an output circuit from which the cell is output by referring to a VPI/VCI conversion table set by a VPI/VCI conversion table unit 905 in a predetermined data format as shown in FIG. 11. It also adds tag information 1001 composed of 3-octet data to the head of the cell. The tag information 1001 contains routing information 1004 for use by a cell switch (not shown in FIG. 11) in a self-routing, routing information 1005 for use by a demultiplexer (DMUX) 916, to which the cell is output, in selecting an output circuit through which the cell is output, valid/invalid information 1002 described later, class information 1003, etc. as shown in part (b) in FIG. 10.

A tag valid/invalid determining unit 907 discards a cell when the valid/invalid information 1002 contained in the tag information 1001 added to the head of the cell output from the tag information adding and VPI/VCI converting unit 906 indicates an invalid state. An invalid state is a state in which no VPI/VCI is detected in an output circuit corresponding to the VPI/VCI of an input cell.

A multiplexer (MUX) 908 multiplexes a cell not discarded by the tag valid/invalid determining unit 907 but output from it with a cell output from another input circuit. Then, the cell is output to a cell switch not shown in FIG. 11.

On the other hand, a cell output from the cell switch (not shown in FIG. 11) is input to the demultiplexer (DMUX) 916. The demultiplexer (DMUX) 916 determines the routing information 1005 contained in the tag information 1001 added to the head of the cell, and transmits the cell to a buffer 909 in the DMUX corresponding to one of a plurality of output circuits accommodated by the demultiplexer (DMUX) 916. The buffer 909 in the DMUX is provided for each output circuit so that each output cell can queue if the number of cells output to each output circuit exceeds the physical band of the output circuit. The buffer 909 in the DMUX counts the number of accumulated cells in the buffer for each of four classes determined by, for example, the 2-bit class information 1003 contained in the tag information 1001 of the cell. If a cell belongs to a class indicating the cell number larger than a predetermined threshold, the buffer 909 in the DMUX discards the cell without writing it when it reaches the buffer.

If the cell is output from the buffer 909 in the DMUX without being discarded, then the tag information 1001 added to the head of the cell is removed by a tag removing unit 910, and the cell is output to the downward optical interface 901 through the ATM layer terminating unit 904, the physical layer terminating unit 903, and an optoelectrical converting circuit 911.

A unit comprising the above described opto-electrical converting circuit 902, the physical layer terminating unit 903, the ATM layer terminating unit 904, the VPI/VCI conversion table unit 905, the tag information adding and VPI/VCI converting unit 906, the tag valid/invalid determining unit 907, and the tag removing unit 910 is provided for each circuit (the optical interface 901) accommodated by the multiplexer (MUX) 908 and the demultiplexer (DMUX) 916, and is realized as a circuit terminating equipment provided with the functions of all of the above listed units. The example shown in FIG. 9 shows illustrates two circuits.

Figure 9:
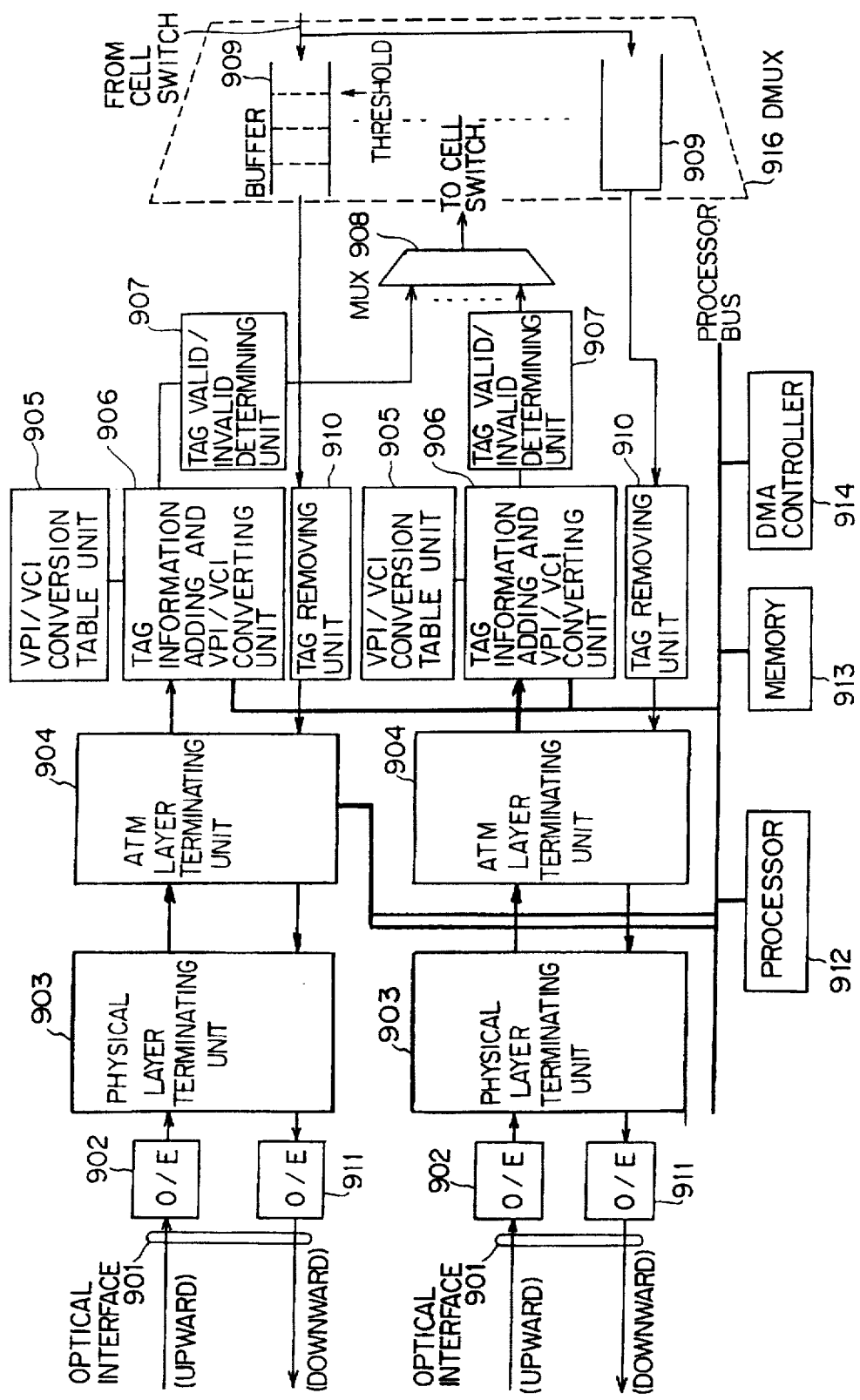
FIG. 9 shows the configuration of an embodiment of the present invention.

On the other hand, a unit comprising a processor 912, a memory 913, a DMA controller 914, and a processor bus (data bus, address bus) 915 is provided for a switching unit containing the structure shown in FIG. 9 and controls the entire operation of the switching unit.

Figure 12:
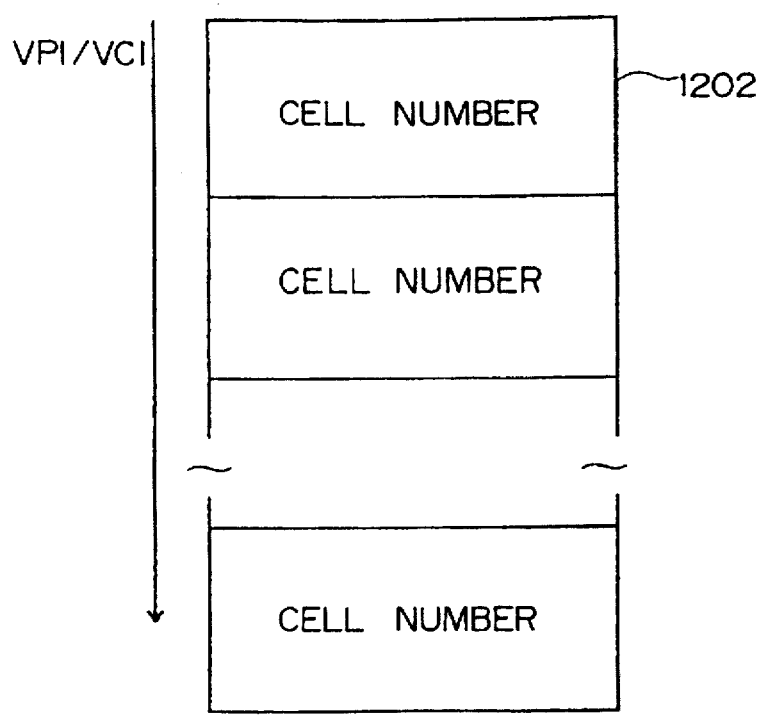
FIG. 12 shows the configuration of the received cell number table.

The ATM layer terminating unit 904 counts the number of passing cells per connection for a small number of connections, for example, 32 connections at predetermined intervals T, for example, every 50 ms (milliseconds). The count result for each connection is DMA-transmitted from the ATM layer terminating unit 904 to the memory 913 through the DMA controller 914 connected to the processor bus 915 at the predetermined time described above, and forms part of a received cell number table 1201. The received cell number table 1201 stored in the memory 913 stores a cell number 1202 in a connection uniquely determined by a VPI and a VCI at an address uniquely assigned by the VPI and the VCI as shown in FIG. 12.

In addition to the above mentioned received cell number table 1201, the memory 913 stores a user-declared band management table 1301 having a data configuration shown in FIG. 13. The user-declared band management table 1301 stores a declared cell number 1302 in a connection uniquely determined by a VPI and a VCI, an illegal cell frequency 1303, a normal cell frequency 1304, a priority 1305 at declaration, and a state 1306 at an address uniquely assigned by the VPI and the VCI as shown in FIG. 13. These data are explained later.

FIGS. 14 through 18 are flowcharts showing the traffic control operation performed by the processor 912 shown in FIG. 9. FIGS. 19A and 19B show the operation according to the preferred embodiments of the present invention.

In the preferred embodiments, the well-known cell counting function initially provided for the ATM layer terminating unit 904 is used as a function of monitoring the number of cells per connection at a given intervals T, for example, every 50 ms. The ATM layer terminating unit 904 is a well-known circuit and counts the number cells per connection for a small number of connections, e.g. 32 connections. If the switching unit having the structure shown in FIG. 9 is used in a private ATM network, then the number of connections multiplexed per circuit (optical interface 901) is 32 connections at most. Therefore, the above described well-known cell counting functions used in this embodiment. The DMA controller 914 DMA-transmits the information about the number of cells per connection at the above mentioned given intervals T from the ATM layer terminating unit 904 to the memory 913 through the processor bus 915. As a result, the statistics of the number of cells per connection at the given intervals T are stored in the memory 913 as the received cell number table 1201 shown in FIG. 12.

The processor 912 performs as an interruption a traffic controlling operation indicated by the operational flowchart shown in FIGS. 14 through 18 for each DMA-transmission, that is, at the above described given intervals T, e.g. 50 ms.

If the determination in step 1401 is "No", then the cell number 1202 in a connection (hereinafter referred to as a corresponding connection) 1202 being processed is read from the received cell number table 1201 in the memory 913 shown in FIG. 12 in step 1402. The cell number 1202 in a connection is compared with the declared cell number 1302 in the corresponding connection stored in the user-declared band management table 1301 in the memory 913 as shown in FIG. 13. The declared cell number 1302 is a piece of data indicating a user-declared band represented by the number of cells input at the above described given intervals T. The corresponding connection is uniquely specified by a VPI and a VCI sequentially read from a call setting table not shown in the attached drawings.

Then, in step 1403, it is determined whether or not the cell number 1202 of the corresponding connection exceeds the declared cell number 1302.

If the determination in step 1403 is "Yes" as a result of an illegal number of cells in the corresponding connection, then it is determined in step 1404 whether or not a state 1306 of the corresponding connection stored in the user-declared band management table 1301 in the memory 913 as shown in FIG. 13 is a normal operation state. A "normal operation state" is a state in which a cell received from a user is being normally transmitted without the downgrade of its quality class in a corresponding connection. The state 1306 is initially set in the normal operation state.

Figure 15:
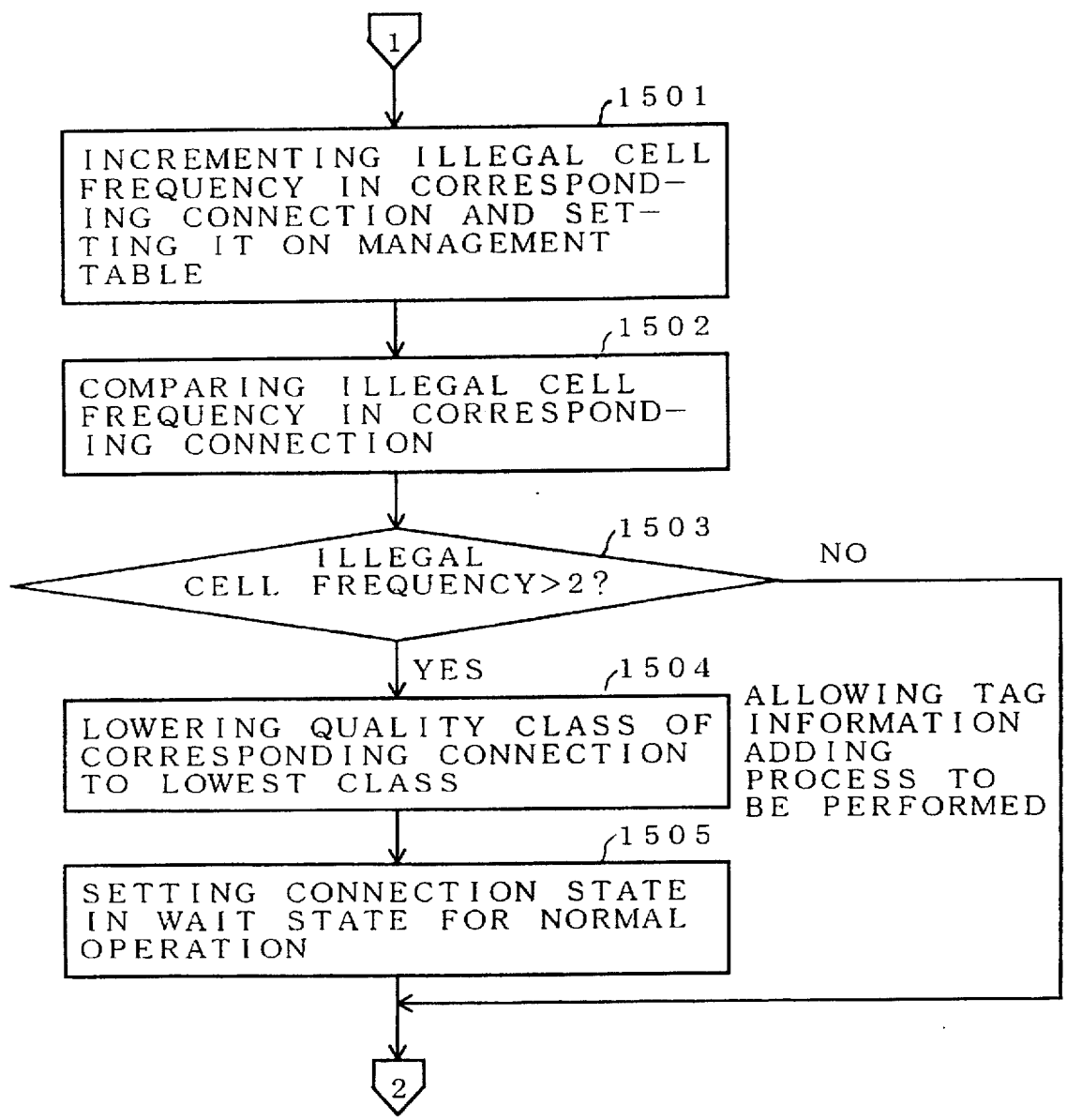
FIG. 15 is a flowchart (2) showing the operation according to the preferred embodiment of the present invention.

If the state 1306 is the normal operation state and the determination in step 1404 is "Yes", then the process in the operational flowchart shown in FIG. 15 is performed.

First in step 1501, incremented is the illegal cell frequency 1303 of the corresponding connection stored in the user-declared band management table 1301 in the memory 913 as shown in FIG. 13. The illegal cell frequency 1303 is initially set to 0.

Then in step 1502, the illegal cell frequency 1303 is checked. In step 1503, it is determined whether or not the illegal cell frequency 1303 exceeds 2.

Figure 14:
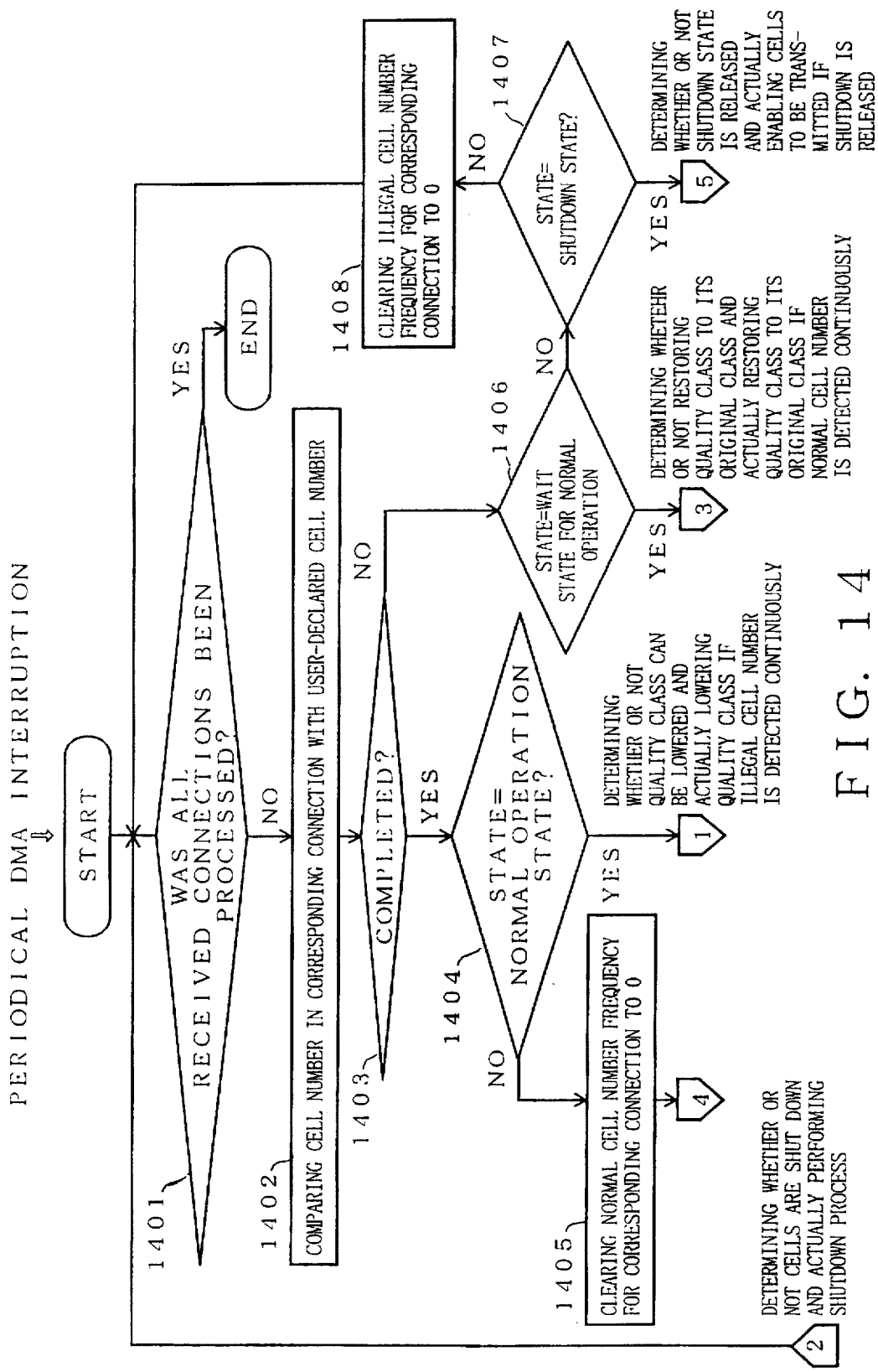
FIG. 14 is a flowchart (1) showing the operation according to the preferred embodiment of the present invention.

If the illegal cell frequency 1303 does not exceed 2, and the determination in step 1503 is "No", then the process of lowering the quality class is not performed on the corresponding connection, but control is returned to step 1401 in FIG. 14 and the traffic control process in and after step 1401 is performed on the next connection.

If the illegal cell frequency 1303 exceeds 2 (that is, reaches 3) and the determination in step 1503 is "Yes", then an instruction is issued in step 1504 to the processor 912 to perform a tag information providing process not shown in the attached drawings so as to lower the quality class of the corresponding connection to the lowest class. As a result, the tag information providing process (not shown in the attached drawings) is performed by the processor 912 and a notification is provided for a VPI/VCI conversion table shown in FIG. 11 and stored in the VPI/VCI conversion table unit 905 through the processor bus 915. Thus, the class information 1003 in the tag information 1001 for the corresponding connection is changed into a value indicating the lowest quality class.

Then, in step 1505, the state 1306 of the corresponding connection stored in the user-declared band management table 1301 in the memory 913 as shown in FIG. 13 is set in a wait state for a normal operation.

Then, control is returned to step 1401 shown in FIG. 14 to perform for the next connection the traffic control process in and after steps 1401.

If an illegal cell number has been detected continuously more than twice for a monitor section (three times continuously) in a normal transmission state in which a cell from a user is transmitted with its quality class not lowered for the corresponding connection at all as shown in FIG. 19A, then a value of the class information 1003 contained in the tag information 1001 for the corresponding connection in the VPI/VCI conversion table-shown in FIG. 11 and stored in the VPI/VCI conversion table unit 905 is changed into a value indicating the lowest quality class as a result of the controlling operation. Then, the tag information 1001 containing the class information 1003 is added to the cell in the corresponding connection by the tag information adding and VPI/VCI converting unit 906, and the cell is assigned the lowest quality class.

The cell assigned the tag information 1001 provided with the class information 1003 is processed as followed in, for example, a buffer connected to an input unit to a cell switch or the buffer 909 in the DMUX connected to an output unit from the cell switch shown in FIG. 9.

Figure 20:
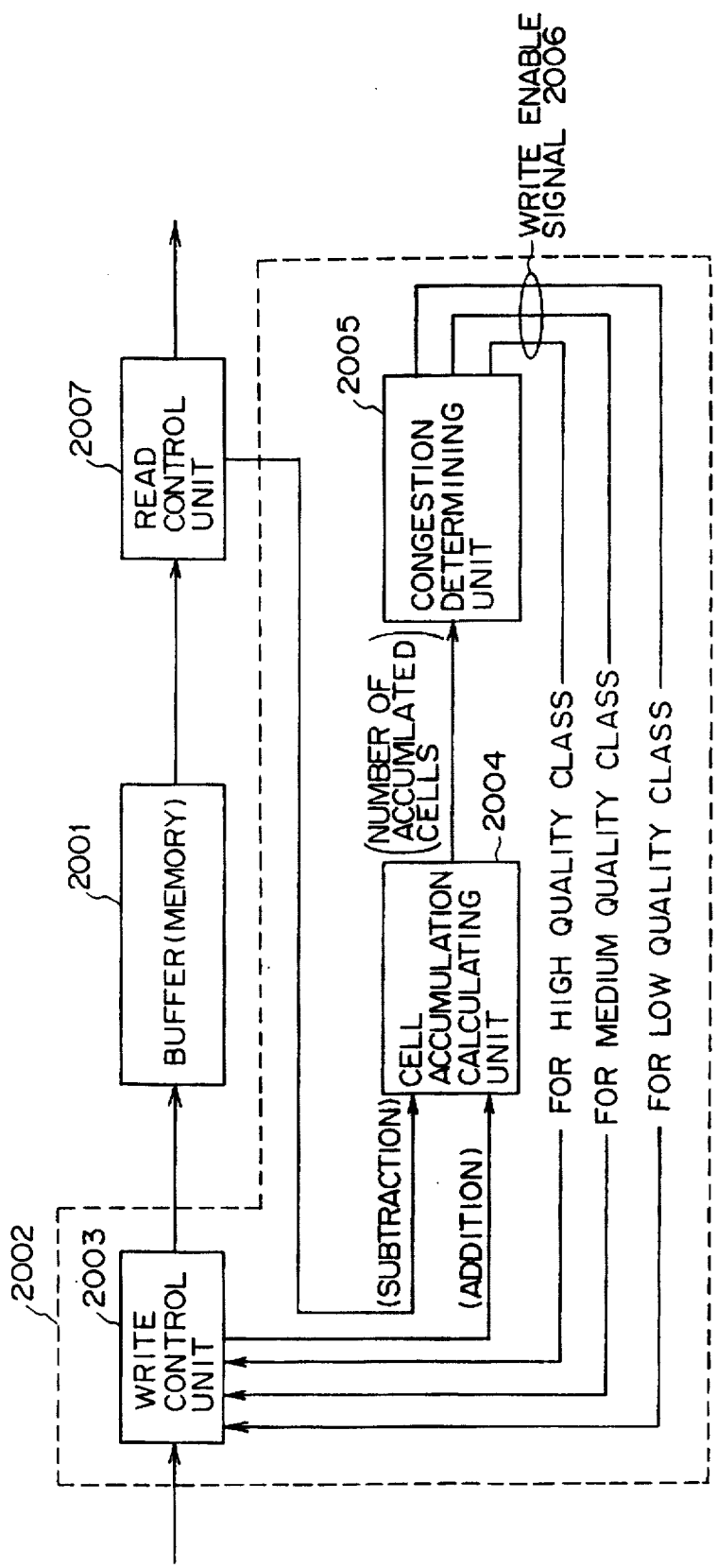
FIG. 20 shows the configuration of the quality class control circuit.
Figure 21:
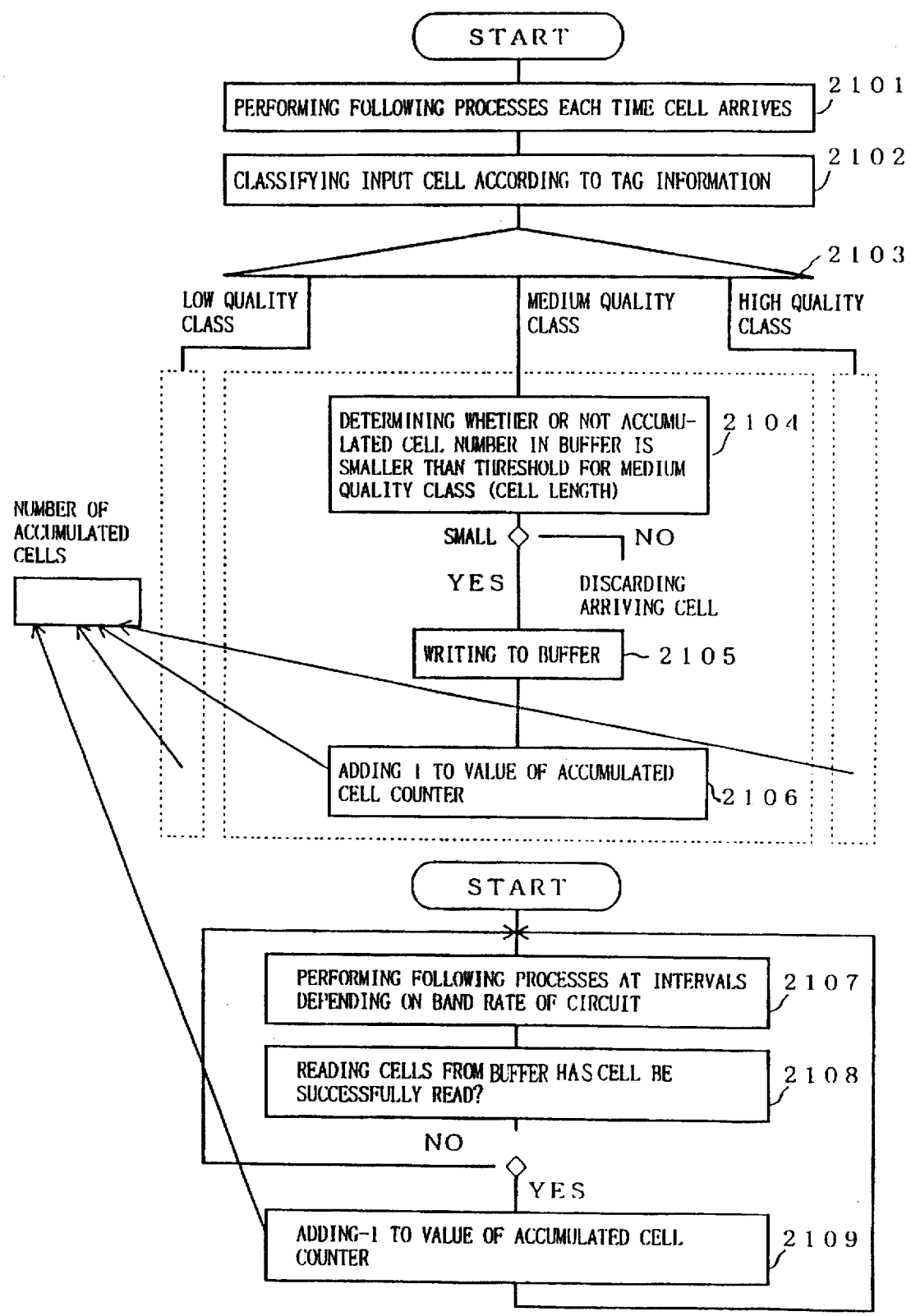
FIG. 21 is a flowchart showing the operation of the quality class control circuit.
Figure 22:
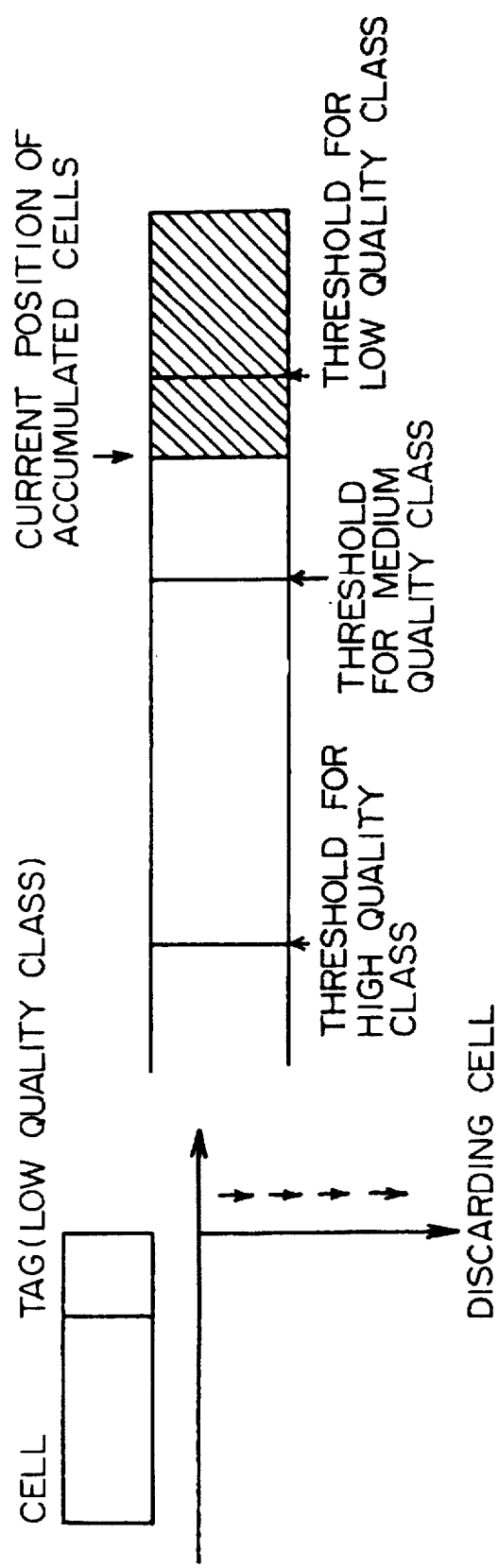
FIG. 22 shows the relationship between the quality class and the buffer input/output operation.

FIG. 20 shows the configuration of a quality class control circuit; FIG. 21 is a flowchart showing the operation performed by the circuit; and FIG. 22 shows a threshold for each quality class.

In FIG. 20, a unit 2002 comprising a write control unit 2003, a cell accumulation calculating unit 2004, and a congestion determining unit 2005 is formed of, for example, a single LSI.

First, a buffer 2001 can be a first-in-first-out (FIFO) buffer.

Upon receipt of a cell, the write control unit 2003 assigns it into a plurality of classes according to the class information 1003 in the tag information 1001 added to the cell (steps 2101 through 2103 shown in FIG. 21).

Then the write control unit 2003 writes the received cell to the buffer (memory) 2001 (step 2105 shown in FIG. 21) if a write enable signal 2006, which corresponds to the class to which the cell belongs and is received from the congestion determining unit 2005, is active.

The cell accumulation calculating unit 2004 increments the value of a built-in accumulated cell counter (step 2106 shown in FIG. 21) each time an arrived cell is written to the buffer 2001 by the write control unit 2003, and decrements the value of the accumulated cell counter (step 2109 shown in FIG. 21) each time a cell of each class is read from the buffer 2001 by a read control unit 2007 described later.

The congestion determining unit 2005 compares a threshold for each quality class predetermined by the processor 912 (FIG. 9) with the number of accumulated cells (a value of accumulated cell counter) stored in the buffer 2001 and output by the cell accumulation calculating unit 2004. If the number of accumulated cells exceeds the threshold for one quality class, the congestion determining unit 2005 sets the write enable signal 2006 corresponding to the quality class inactive. Otherwise, it sets the write enable signal 2006 corresponding to the quality class active.

The read control unit 2007 reads cells accumulated in the buffer 2001 at intervals depending on the baud rate of an output circuit (steps 2107 and 2108 shown in FIG. 21). If the reading operation has been successfully performed, the read control unit 2007 outputs a signal indicating the decrement of the value of the accumulated cell counter to the cell accumulation calculating unit 2004. If there are no cells to be read, no process is performed.

The practical operations of the above described quality class control circuit is explained below by referring to FIG. 22.

As explained above, a threshold of the number of cells accumulated in the buffer is determined for each of the four quality classes according to the 2-bit class information 1003 contained in the tag information 1001 and is stored in the buffer 2001. A higher class is assigned a higher threshold value of cells accumulated in the buffer.

If an additional cell of the lowest quality class arrives when the number of accumulated cells exceeds the threshold of the lowest quality class as indicated by a hatched portion in FIG. 22, then the cell cannot be written to the buffer 2001. On the other hand, if a cell of another higher quality class has arrived, then the cell can be written to the buffer because the number of the cells of the higher quality class has not exceeded the threshold assigned to the class.

Thus, a cell in a connection indicating an illegal cell number is discarded by priority. As a result, the band of the connection is forced to be deleted. Thus, another connection can be protected from being affected by the connection which has caused a cell number error.

Figure 16:
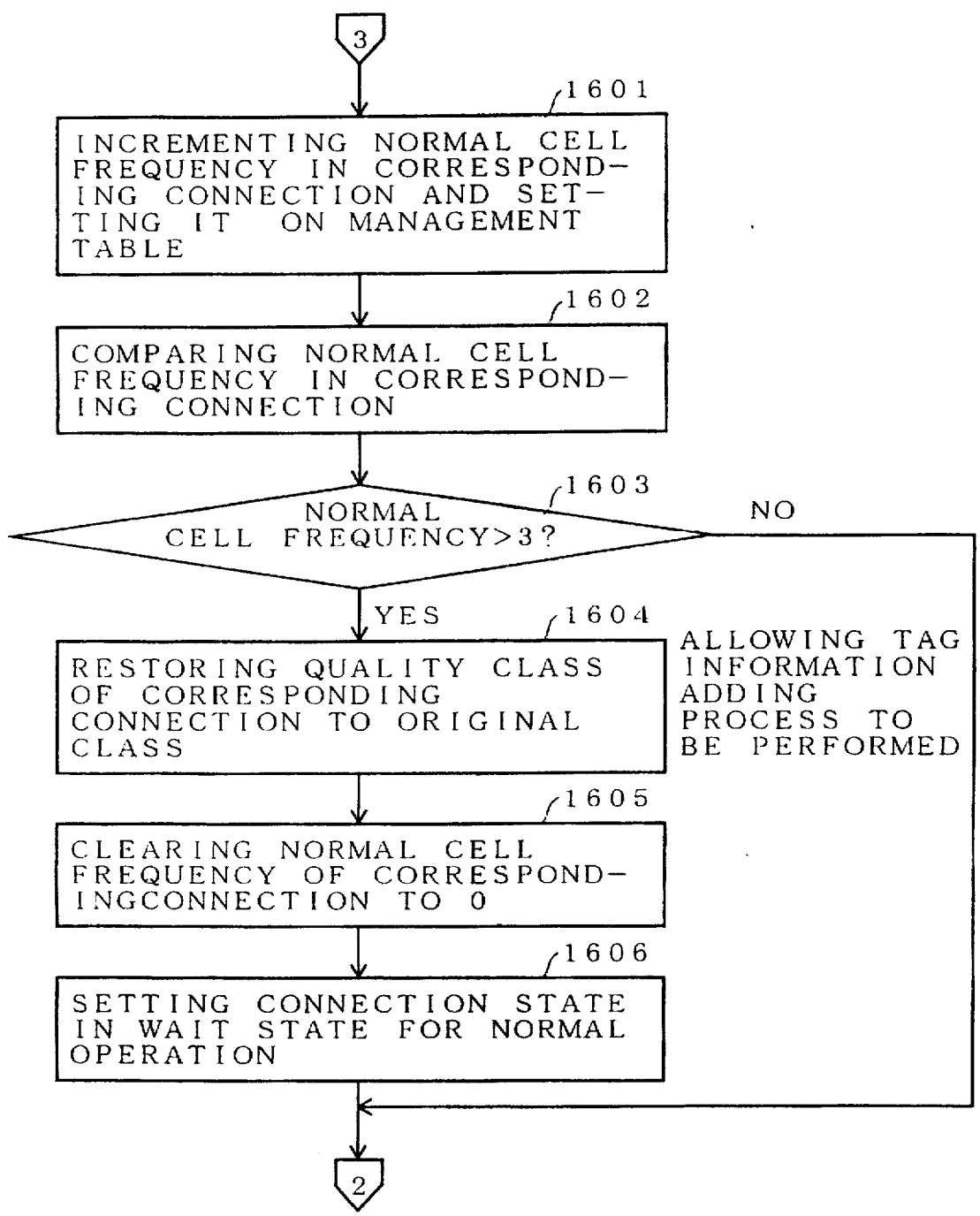
FIG. 16 is a flowchart (3) showing the operation according to the preferred embodiment of the present invention.

If the determination in step 1403 is "No" with no illegal cell number detected in a corresponding connection in a wait state for a normal operation after the downgrade of the quality class, then the process indicated by the operational flowchart shown in FIG. 16 is performed after the determination in step 1406 turns to "Yes".

In step 1601, incremented is the value of the normal cell frequency 1304 in a corresponding connection stored in the user-declared band management table 1301 in the memory 913 as shown in FIG. 13. The normal cell frequency 1304 is initially set to 0.

Then in step 1602, the normal cell frequency 1304 is checked. In step 1603, it is determined whether or not the normal cell frequency 1304 has exceeded 3.

If the normal cell frequency 1304 does not exceed 3 and the determination in step 1603 is "No", then the process of restoring the quality class of a corresponding connection to its original quality class is not performed. In this case, control is returned to step 1401, and the traffic control process in and after step 1401 is performed on the next connection.

If the normal cell frequency 1304 has exceeded 3 (that is, reached 4) and the determination in step 1603 is "Yes", then an instruction is issued in step 1604 to the processor 912 to perform a tag information providing process not shown in the attached drawings so as to restore the quality class of the corresponding connection from the lowest class to the quality class 1305 at declaration for the corresponding connection entered by the user in the user-declared band management table 1301 in the memory 913 as shown in FIG. 13. As a result, the tag information providing process (not shown in the attached drawings) is performed by the processor 912 and a notification is provided for a VPI/VCI conversion table shown in FIG. 11 and stored in the VPI/VCI conversion table unit 905 through the processor bus 915. Thus, the class information 1003 in the tag information 1001 for the corresponding connection is restored to the value of the quality class 1305 for the corresponding connection at declaration stored in the user-declared band management table 1301 in the memory 913 as shown in FIG. 13.

In the user-declared band management table 1301 in the memory 913 as shown in FIG. 13, the value of the normal cell frequency 1304 in the corresponding connection is cleared to 0 in step 1605, and the state 1306 of the corresponding connection is restored to the normal operation state in step 1606. Then, control is returned to step 1401 in FIG. 14, and the traffic control process is performed on the corresponding connection in and after step 1401.

If a normal cell number has been detected continuously more than three times for a monitor section (four times continuously) in a transmission state in which a cell from a User is transmitted with its quality class lowered to the lowest quality class for the corresponding connection as shown in FIG. 19A, then a value of the class information 1003 contained in the tag information 1001 for the corresponding connection in the VPI/VCI conversion table shown in FIG. 11 and stored in the VPI/VCI conversion table unit 905 is restored to a value of the quality class 1305 at declaration stored in the user-declared band management table 1301 in the memory 913 as shown in FIG. 13 as a result of the controlling operation. Then, the tag information 1001 containing the class information 1003 is added to the cell in the corresponding connection by the tag information adding and VPI/VCI converting unit 906, and the cell is assigned the lowest quality class.

Figure 17:
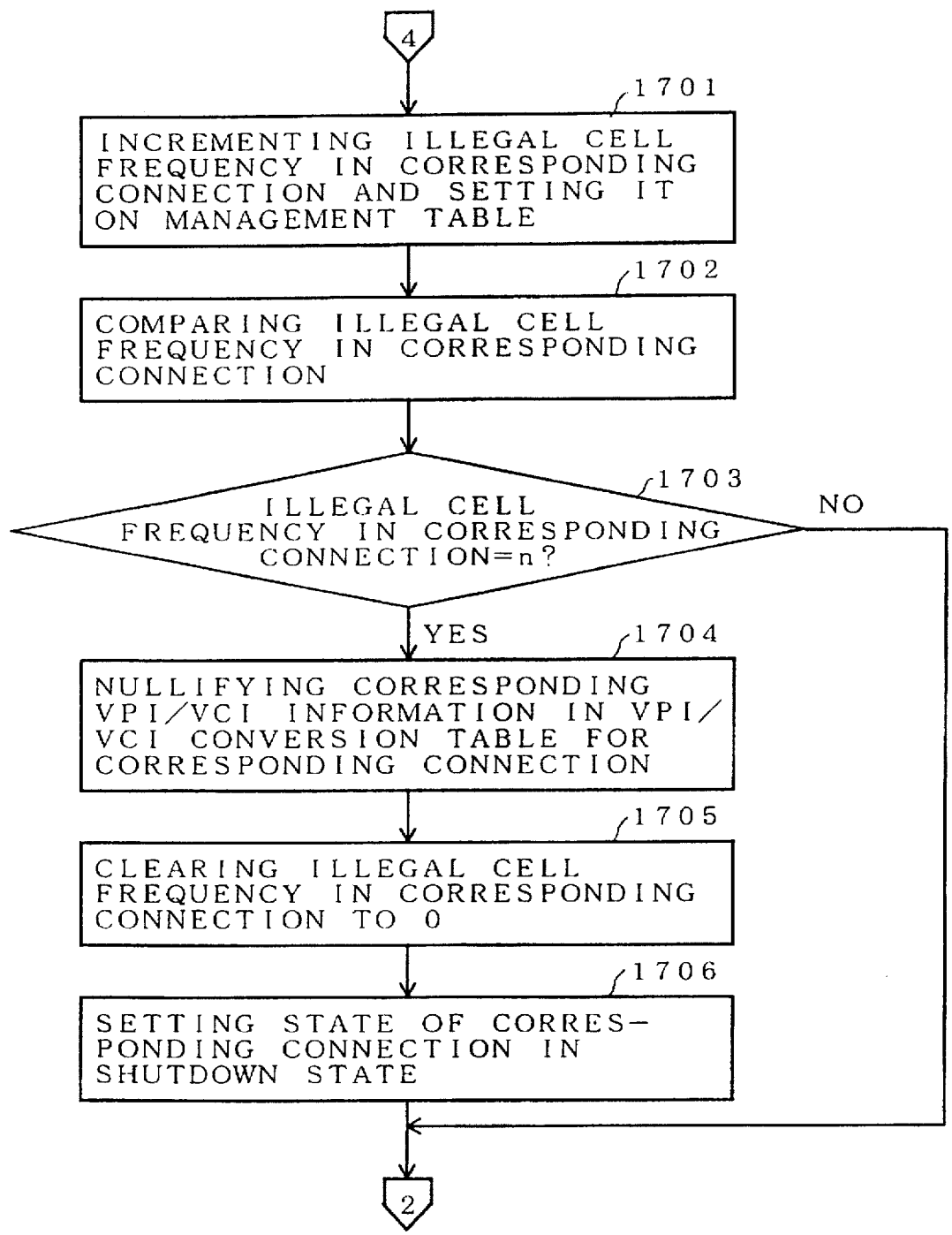
FIG. 17 is a flowchart (4) showing the operation according to the preferred embodiment of the present invention.

On the other hand, if an illegal cell number is continuously detected in the corresponding connection in a wait state for a normal operation with the quality class lowered as described above, or if the illegal cell number is continuously detected again after no illegal cell number is detected, then the process indicated by the operational flowchart shown in FIG. 17 is performed after the determination in step 1403 indicates "Yes", the determination in step 1404 indicates "No", and the normal cell frequency 1304 in the corresponding connection stored in the user-declared band management table 1301 in the memory 913 as shown in FIG. 13 is cleared to 0 in step 1405.

First, in step 1701, the illegal cell frequency 1303 in the corresponding connection stored in the user-declared band management table 1301 in the memory 913 as shown in FIG. 13 is incremented.

Then, in step 1702, the above mentioned illegal cell frequency 1303 is checked, and it is determined in step 1703 whether or not the illegal cell frequency 1303 has reached n.

If the illegal cell frequency 1303 has not reached n and the determination in step 1703 is "No", then the process of stopping cells from flowing into the corresponding connection is not executed. Instead, control is returned to step 1401 shown in FIG. 14, and the traffic control process in and after step 1401 is performed on the next connection.

If the illegal cell frequency 1303 has reached n and the determination in step 1703 is "Yes", then the determination result is transmitted to the VPI/VCI conversion table stored in the VPI/VCI conversion table unit 905 as shown in FIG. 11 via the processor bus 915 in step 1704. Then, a value indicating an invalid state is set in the valid/invalid information 1002 contained in the tag information 1001 for the corresponding connection.

In the user-declared band management table 1301 in the memory 913 as shown in FIG. 13, the value of the illegal cell frequency 1303 in the corresponding connection is cleared to 0 in step 1705, and the state 1306 of the corresponding connection is changed into a shutdown state in step 1706. Then, control is returned to step 1401 in FIG. 14, and the traffic control process is performed on the corresponding connection in and after step 1401.

If an illegal cell number has been detected n times continuously for a monitor section in a transmission state in which a cell from a user is transmitted with its quality class lowered to the lowest quality class for the corresponding connection as shown in FIG. 19B, then a value indicating an invalid state is set in the valid/invalid information 1002 contained in the tag information 1001 for the corresponding connection in the VPI/VCI conversion table shown in FIG. 11 and stored in the VPI/VCI conversion table unit 905. Then, the tag information 1001 containing valid/invalid information 1002 is added to the cell in the corresponding connection by the tag information adding and VPI/VCI converting unit 906.

In this state, for example, a user terminal unit is faulty and transmits abnormal cells over a network. Therefore, a cell is provided with the above described tag information 1001 and recognized by the tag valid/invalid determining unit 907 as being assigned the valid/invalid information 1002 indicating an invalid state in the tag information 1001 added to the cell. As a result, the cell is discarded. That is, a cell in the corresponding connection is stopped from being transmitted to a cell switch.

Figure 18:
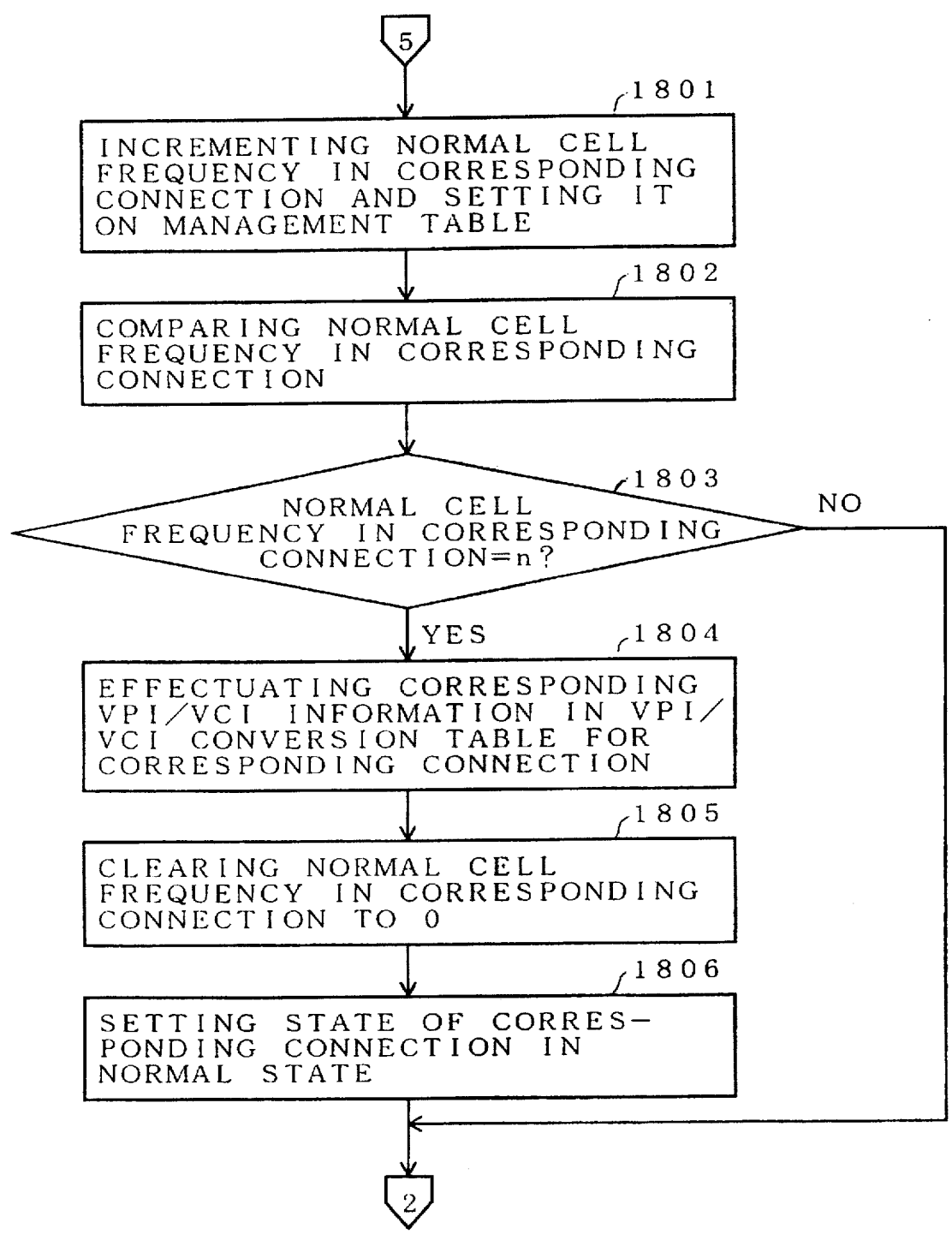
FIG. 18 is a flowchart (5) showing the operation according to the preferred embodiment of the present invention.
Figure 19:
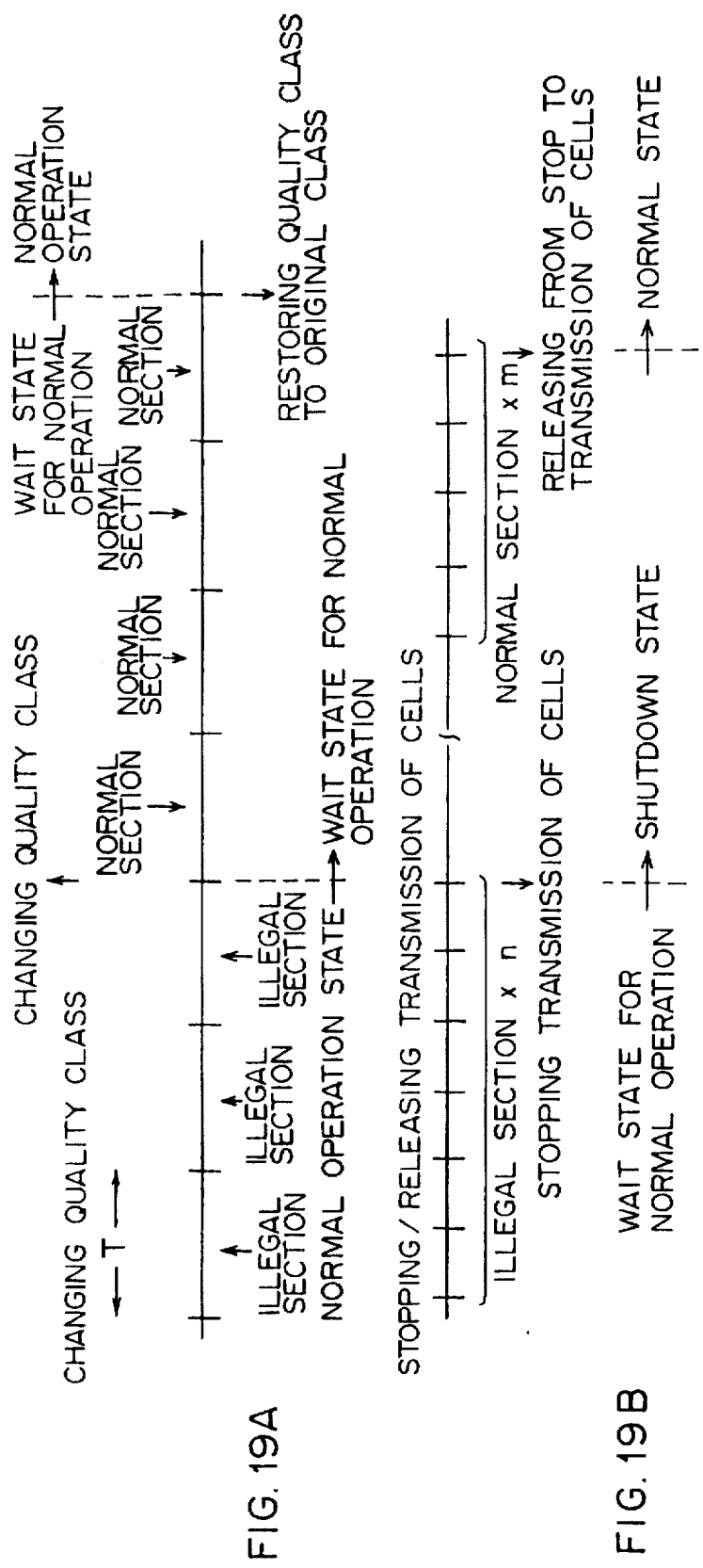
FIGS. 19A and 19B show the operation according to the embodiment of the present invention.

As described above, if no illegal cell number is detected and the determination in step 1403 is "No" in the corresponding connection in a shutdown state in which cells are prevented from being transmitted to a cell switch, then the process indicated by the operational flowchart shown in FIG. 18 is executed when the determination in step 1406 is "No" and the determination in step 1407 is "Yes".

In step 1801, incremented is the value of the normal cell frequency 1304 in a corresponding connection stored in the user-declared band management table 1301 in the memory 913 as shown in FIG. 13. The normal cell frequency 1304 is cleared to 0 when the corresponding connection enters a shutdown state (refer to step 1405 shown in FIG. 14).

Then in step 1802, the normal cell frequency 1304 is checked. In step 1803, it is determined whether or not the normal cell frequency 1304 has reached m.

If the normal cell frequency 1304 has not reached m and the determination in step 1803 is "No", then the process of releasing the stop to the transmission of cells to the cell switch is not performed. In this case, control is returned to step 1401, and the traffic control process in and after step 1401 is performed on the next connection.

If the normal cell frequency 1304 has reached m and the determination in step 1803 is "Yes", then the determination result is transmitted to the VPI/VCI conversion table stored in the VPI/VCI conversion table unit 905 as shown in FIG. 11 via the processor bus 915 in step 1804. Then, a value indicating an invalid state is set in the valid/invalid information 1002 contained in the tag information 1001 for the corresponding connection.

In the user-declared band management table 1301 in the memory 913 as shown in FIG. 13, the value of the normal cell frequency 1304 in the corresponding connection is cleared to 0 in step 1805, and the state 1306 of the corresponding connection is restored to the normal operation state in step 1806. Then, control is returned to step 1401 in FIG. 14, and the traffic control process is performed on the corresponding connection in and after step 1401.

If a normal cell number has been detected m times continuously for a monitor section in a transmission state in which a cell from a user is stopped from being transmitted to a cell switch for the corresponding connection as shown in FIG. 19B, then a value indicating a valid state is set in the valid/invalid information 1002 contained in the tag information 1001 for the corresponding connection in the VPI/VCI conversion table shown in FIG. 11 and stored in the VPI/VCI conversion table unit 905. Then, the tag information 1001 containing valid/invalid information 1002 is added to the cell in the corresponding connection by the tag information adding and VPI/VCI converting unit 906. Therefore, a cell is provided with the tag information 1001 and is not discarded in the tag valid/invalid determining unit 907, and is released from the stop to the transmission of cells to a cell switch.

Finally, if no illegal cell number is detected and the determination in step 1403 is "No" in the normal operation state in which a cell from a user is normally transmitted without being lowered in its quality class, then the illegal cell frequency 1303 in the corresponding connection stored in the user-declared band management table 1301 in the memory 913 as shown in FIG. 13 is cleared to 0 in step 1408 when the determinations in steps 1406 and 1407 are "No". Then, control is returned to step 1401 shown in FIG. 14, and the traffic control process in and after step 1401 is performed for the next connection.

If the process in and after step 1402 has been completed on the connections of all users entered in a call setting table not shown in the attached drawings, then the determination in step 1401 is "Yes" and the interruption indicated in the operational flowchart shown in FIGS. 14 through 18 terminates.

Thus, upon completion of the next DMA transmission, the processor 912 activates again as an interruption the traffic control operation indicated in the operational flowchart shown in FIG. 14 through 18.

In the above listed preferred embodiments, the number of cells per connection is monitored at given intervals T, e.g. 50 ms (milliseconds). Obviously, it is not limited to this application. That is, the number of cells does not have to be monitored together with the traffic control based on the number of cells until a congestion state starts arising in a switching unit. Practically, in a buffer connected to an input unit to a cell switch in which the amount of cell is controlled based on, for example, a quality class, or in the buffer 909 in the DMUX connected to an output unit from the cell switch shown in FIG. 9, the processor 912 shown in FIG. 9 starts performing the operational flowchart shown in FIGS. 14 through 18 if the current position of the accumulated cells in the buffer has reached a given threshold or the threshold of the lowest quality class. With the configuration, the processor 912 can solve the problem that an increased process load lowers the performance in response in a call setting process, etc.

What is claimed is:

1. A traffic control device which is operated in a network, and which controls transmission quality of a cell according to a quality class assigned to the cell in each connection in the network, the device comprising:

quality class management means for managing a quality class which is assigned in said each connection;

quality class addition means for adding said quality class assigned in a connection of a cell to a cell input from an input line;

flow monitor means for monitoring a flow of cells in each connection for monitor sections segmented at predetermined intervals;

violation decision means for deciding whether or not an illegal number of cells have been detected by comparing the flow of cells in each monitor section of each connection monitored by the flow monitor means with a flow of cells preliminarily declared for each connection; and quality class change means for changing the quality class of the cell in a connection into one class lower than a present quality class if said violation decision means detects an illegal cell number.

2. A traffic control device which is operated in a network, and which controls transmission quality of a cell according to a quality class assigned to the cell in each connection in the network, the device comprising:

quality class management means for managing a quality class which is assigned in said each connection;

quality class addition means for adding said quality class assigned in a connection of a cell to a cell input from an input line;

flow monitor means for monitoring a flow of cells in each connection for monitor sections segmented at predetermined intervals;

illegal cell number monitor means for monitoring whether or not an illegal number of cells have been detected in a predetermined time unit by comparing the flow of cells in each monitor section of each connection monitored by the flow monitor means with a flow of cells in a monitor section preliminarily declared for each connection; and quality class restoring means for restoring the quality class of the cell in a connection to a quality class preliminarily set for the connection if said illegal cell number monitor means has determined that a state in which the illegal number of cells do not exist has been detected for the connection.

3. A traffic control device which is operated in a network and which controls transmission quality of a cell according to a quality class assigned to the cell in each connection in the network, the device comprising:

quality class management means for managing a quality class which is assigned in said each connection;

quality class addition means for adding said quality class assigned in a connection of a cell to a cell input from an input line;

flow monitor means for monitoring a flow of cells in each connection for monitor sections segmented at predetermined intervals;

illegal cell number monitor means for monitoring whether or not an illegal number of cells have been detected in a predetermined time unit by comparing the flow of cells in each monitor section of each connection monitored by the flow monitor means with a flow of cells in a monitor section preliminarily declared for each connection;

quality class change means for changing the quality class of the cell in a connection into one class lower than a present quality class if said illegal cell number monitor means has determined for the connection that the state in which the illegal number of cells exists has been detected;

state determining means for determining whether or not said illegal cell number monitor means has detected a state in which the illegal number of cells do not exist in the monitor section for the connection whose quality class has been lowered by said quality class change means; and quality class restoring means for restoring the quality class of the cell in a connection to a quality class preliminarily set for the connection if said state determining means has determined that a state in which the illegal number of cells do not exist has been detected for the connection.

4. The traffic control device according to claim 3, wherein said quality class restoring means restores a value of class information contained in tag information added to the cell in the connection determined by said state determining means to a value corresponding to the quality class preliminarily assigned to the connection.

5. The traffic control device according to claim 3, further comprising:

congestion determining means for determining whether or not traffic congestion is arising in the network, wherein a traffic controlling operation is started when it is determined that the traffic congestion is arising.

6. A traffic control device which is operated in a network, and which controls transmission quality of a cell according to a quality class assigned to the cell in each connection in the network, the device comprising:

quality class management means for managing a quality class which is assigned in said each connection;

quality class addition means for adding said quality class assigned in a connection of a cell to a cell input from an input line;

flow monitor means for monitoring a flow of cells in each connection for monitor sections segmented at predetermined intervals;

illegal cell number monitor means for monitoring whether or not an illegal number of cells have been detected in a predetermined time unit by comparing the flow of cells in each monitor section of each connection monitored by the flow monitor means with a flow of cells in a monitor section preliminarily declared for each connection;

state determining means for determining whether or not said illegal cell number monitor means has detected a state in which the illegal number of cells exist in the monitor section for the connection whose quality class has been lowered in the network; and cell discarding means for discarding the cell in the connection if said state determining means has determined that the state in which the illegal number of cells exist has been detected.

7. The traffic control device according to claim 6, wherein said cell discarding means comprises:

invalid state setting means for changing into a value indicating an invalid state of a value of valid/invalid information contained in tag information added to the cell in the connection determined by said state determining means; and cell valid/invalid determination control means for discarding the cell if the value of the valid/invalid information contained in the tag information added to the cell transmitted in the network is the value indicating the invalid state.

8. A traffic control device which is operated in a network, and which controls transmission quality of a cell in each connection in the network, the device comprising:

quality class management means for managing a quality class which is assigned in said each connection;

quality class addition means for adding said quality class assigned in a connection of a cell to a cell input from an input line;

flow monitor means for monitoring a flow of cells in each connection for monitor sections segmented at predetermined intervals;

illegal cell number monitor means for monitoring whether or not an illegal number of cells have been detected in a predetermined time unit by comparing the flow of cells in each monitor section of each connection monitored by the flow monitor means with a flow of cells in a monitor section preliminarily declared for each connection;

cell discarding means for discarding a cell in the network;

state determining means for determining whether or not said illegal cell number monitor means has detected in the monitor section a state in which the illegal number of cells does not exist for the connection corresponding to the cell discarded in the network; and cell discard suppressing means for changing a value of valid/invalid information contained in tag information added to the cell in the connection determined by said state determining means into a value indicating a valid state and preventing said cell discarding means from discarding the cell in the connection if said state determining means has determined for the connection that the state in which the illegal number of cells does not exist has been detected.

* * * * *